United States Patent
Kawakami et al.

(10) Patent No.: US 6,475,664 B1
(45) Date of Patent: Nov. 5, 2002

(54) ALKALI RECHARGEABLE BATTERIES AND PROCESS FOR THE PRODUCTION OF SAID RECHARGEABLE BATTERIES

(75) Inventors: Soichiro Kawakami, Nara (JP); Atsushi Tani, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 09/658,946

(22) Filed: Sep. 11, 2000

(30) Foreign Application Priority Data

Sep. 9, 1999 (JP) .......................................... 11-255840

(51) Int. Cl.$^7$ .......................... H01M 2/16; H01M 4/58; H01M 4/62
(52) U.S. Cl. ..................... 429/137; 429/218.2; 429/246; 427/126.4; 205/324; 205/325
(58) Field of Search ............................. 429/137, 218.2, 429/212, 246; 205/329, 325; 427/126.4

(56) References Cited

U.S. PATENT DOCUMENTS

| | | | |
|---|---|---|---|
| 3,844,908 A | * 10/1974 | Matsuo et al. ........... | 205/325 X |
| 4,668,347 A | * 5/1987 | Habermann et al. .... | 205/324 X |
| 5,641,591 A | 6/1997 | Kawakami et al. .......... | 429/218 |
| 5,698,339 A | 12/1997 | Kawakami et al. .......... | 429/212 |
| 5,824,434 A | 10/1998 | Kawakami et al. .......... | 429/209 |
| 6,040,087 A | 3/2000 | Kawakami ............... | 429/218.1 |
| 6,063,142 A | 5/2000 | Kawakami et al. ......... | 29/623.5 |
| 6,071,644 A | * 6/2000 | Ikemachi et al. ......... | 429/218.2 |
| 6,270,547 B1 | * 8/2001 | Imoto et al. ................... | 75/228 |
| 6,322,925 B1 | * 11/2001 | Matsuura et al. ........ | 429/218.2 |
| 6,342,318 B1 | * 1/2002 | Hirota et al. ............. | 429/218.2 |

FOREIGN PATENT DOCUMENTS

| | | | |
|---|---|---|---|
| JP | 10-106550 | * 4/1998 | ............ H01M/4/38 |
| JP | 10-172552 | * 6/1998 | ............ H01M/4/38 |
| JP | 10-275631 | 10/1998 | |
| JP | 2000-058047 | * 2/2000 | ............ H01M/4/38 |

OTHER PUBLICATIONS

T. Kohno, et al., "The electrochemical characteristics of MG–Mg$_2$Ni alloy electrode", 37$^{th}$ Battery Symp., Tokyo, pp. 389–390 (1996). (Month Unknown).

* cited by examiner

Primary Examiner—Stephen Kalafut
(74) Attorney, Agent, or Firm—Fitzpatrick, Cella, Harper & Scinto

(57) ABSTRACT

An alkali rechargeable battery having an anode principally comprising a magnesium-nickel alloy capable of storing hydrogen therein and releasing said hydrogen stored therein in electrochemical reaction, wherein said magnesium-nickel alloy constituting said anode has a surface having a coat layer provided thereon, and said coat layer comprises an insulating material which is not dissolved in an electrolyte solution comprising an aqueous alkali solution used in said rechargeable battery, which restrains a reaction which cases a magnesium hydroxide when said magnesium-nickel alloy contacts with said electrolyte solution, and which allows hydrogen or hydrogen ion to pass therethrough. A process for the production of said rechargeable battery.

25 Claims, 8 Drawing Sheets

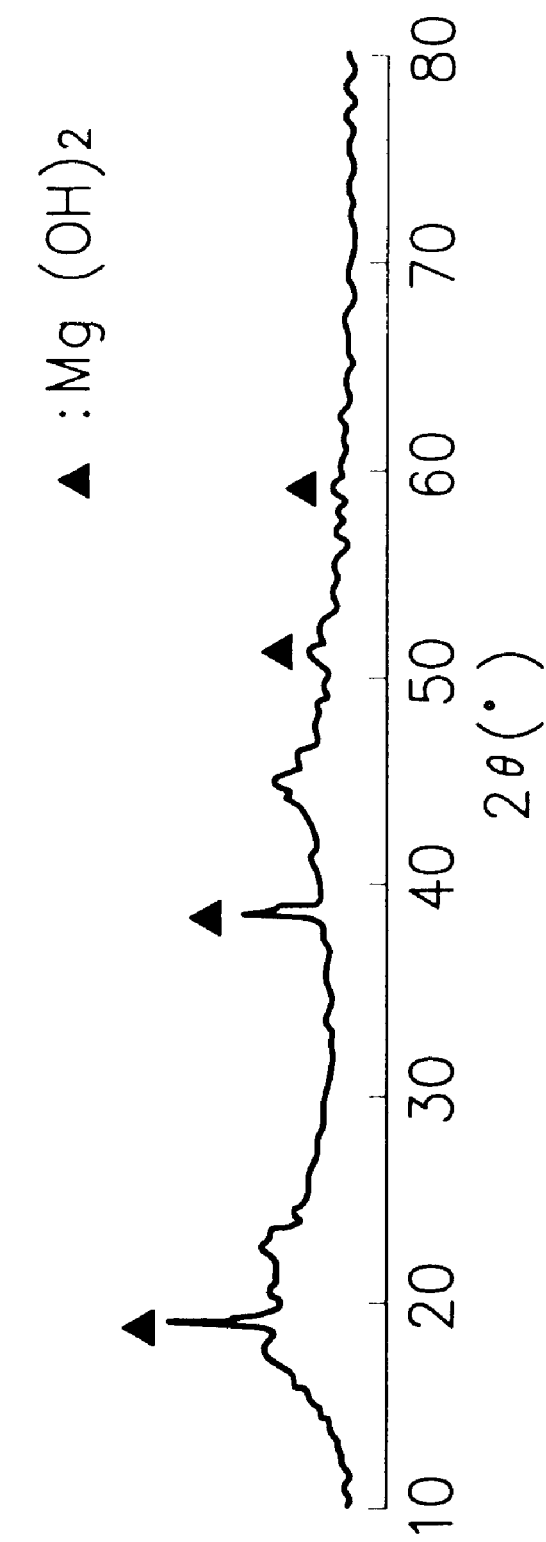

ALKALI RECHARGEABLE BATTERIES AND PROCESS FOR THE PRODUCTION OF SAID RECHARGEABLE BATTERIES

BACKGROUND OF THE INVENTION

1. Field of the Invention

The present invention relates to alkali rechargeable batteries in which an anode principally comprising a magnesium-nickel alloy is used and a process for producing said rechargeable batteries.

2. Related Background Art

In recent years, the global warming of the earth because of the so-called greenhouse effect due to an increase in the content of $CO_2$ gas in the air has been predicted. For instance, in thermal electric power plants, thermal energy obtained by burning a fossil fuel is being converted into electric energy, and along with burning of such fossil fuel, a large amount of $CO_2$ gas is being exhausted in the air. Accordingly, in order to suppress this situation, there is a tendency of prohibiting to newly establish a thermal electric power plant. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust any air polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, word processors, video cameras, and cellular phones.

Under such circumstances, there are known so-called nickel-metalhydride rechargeable batteries belonging to an alkali rechargeable battery, which have an anode comprising a hydrogen absorption alloy having a performance of absorbing and storing hydrogen (this performance will be hereinafter referred to as "hydrogen-absorbing and storing performance") and which has a high capacity.

As the hydrogen absorption alloy which constitutes the anode of such nickel-metalhydride rechargeable battery, there have been proposed mish metal series alloys represented by $Mm(Ni—Co—Mn—Al)_5$, transition metal series alloys represented by Ti—Zr—Ni—V—Cr—Co—Mn, and magnesium-nickel alloys, i.e., $Mg_2Ni$ alloy and MgNi alloy. Of these, such mish metal series alloy and such transition metal series alloy have been used as an electrode material to constitute the anode of the nickel-hydride rechargeable battery.

Now, in *The 37th Battery Symposium in Japan*, p.p. 389–390 (1996) (hereinafter referred to as "document 1"), there is described about electrode characteristics of a Mg—$Mg_2Ni$ alloy powder prepared with a mechanical grinding method. Particularly in document 1, there is described that an anode was prepared using a composite powder obtained by subjecting a mixture of $Mg_2Ni$ and Ni to a mechanical treatment using a planetary ball mill, a nickel-metalhydride battery was prepared using said anode, and said nickel-metalhydride battery was subjected to charge-and-discharge cycle test under condition with a temperature of 25° C. to observe electrochemical characteristics of the battery. And document 1 describes that at the first charge-and-discharge cycle, there was obtained a large discharge capacity of 750 mAh/g. However, as apparent from FIG. 2 on page 390 of document 1, it is understood that the discharge capacity is significantly decreased as the number of the charge-and-discharge cycle is increased. Hence, it is understood that there was not obtained a magnesium-nickel alloy electrode which stably and continuously provides a high discharge capacity when used as the anode of a rechargeable battery.

Besides, Japanese Unexamined Patent Publication No. 275631/1998 (corresponding to U.S. Pat. No. 6,040,087) [this publication will be hereinafter referred to as "document 2"] discloses an electrode member for an anode of an alkali rechargeable battery, comprising a core layer (a first layer) of a hydrogen absorption alloy comprising, for instance, nickel and magnesium, a metal oxide layer (a second layer) provided on the surface of said core layer and having a function to prevent the oxidation of the hydrogen absorption alloy constituting the core layer, and a metal dispersion layer (a third layer) provided on the surface of said metal oxide layer, comprising a transition metal element provided having a property to activate hydrogen. Document 2 describes that according to said electrode member, it is possible that hydrogen is absorbed by the metal dispersion layer situated on the outermost surface side to efficiently generate atomic hydrogen by virtue of catalytic action of the transition metal element, and said atomic hydrogen and hydrogen ion passed through the metal oxide layer are stored in the hydrogen absorption alloy constituting the core layer. Document 2 further describes that a nickel-metalhydride rechargeable battery having an anode prepared using aforesaid electrode member has advantages such that the quantity of the hydrogen stored in the anode upon charging is increased, the charging efficiency, the charge capacity and the discharge capacity are improved, and the battery has a prolonged cycle life (a prolonged charging and discharging cycle life). Although the electrode member disclosed in document 2 provides such various advantages as above described, there is still a demand for improving said electrode member to have more improved characteristics or for providing other adequate electrode member having excellent characteristics even when it has a constitution which is different from that of the electrode member disclosed in document 2.

SUMMARY OF THE INVENTION

The present invention has been accomplished in view of the foregoing situation in the prior art for alkali rechargeable batteries represented by nickel-metalhydride rechargeable batteries.

An object of the present invention is to provide a high performance alkali rechargeable battery having an improved charge-and-discharge capacity and a prolonged cycle life (a prolonged charging and discharging cycle life).

Another object of the present invention is to provide an alkali rechargeable battery comprising at least an anode, a cathode, and an electrolyte or an electrolyte solution, said anode principally comprising a magnesium-nickel alloy capable of absorbing and storing hydrogen therein and releasing the hydrogen stored therein in the electrochemical reaction, wherein said magnesium-nickel alloy constituting said anode has a surface having a coat layer provided thereon, said coat layer comprising an insulating material which is not dissolved in an aqueous solution of a hydroxide of an alkali metal as said electrolyte solution, which restrains a reaction which forms a magnesium hydroxide when said magnesium-nickel alloy contacts with said aqueous alkali solution, and which allows contacts with said aqueous alkali solution, and which allows hydrogen or hydrogen ion to pass therethrough. Said insulating material comprises a hydrous oxide, a hydroxide or an ionomer-containing polymer. In this rechargeable battery, said magnesium-nickel allow constituting said anode is prevented from directly contacting with and reacting with said aqueous alkali solution as the electrolyte solution, whereby the high hydrogen-absorbing and storing performance of the magnesium-nickel alloy which contains amorphous phases by nature is prevented from being deteriorated. Because of this, the rechargeable battery has an improved charge-and-discharge capacity and a prolonged cycle life.

A further object of the present invention is to provide a process for producing aforesaid rechargeable battery, characterized by including at least a step of forming the anode of the rechargeable battery by coating a magnesium-nickel alloy constituting said anode using at least an aluminum material, or by subjecting (i) an electrode formed using a magnesium-nickel alloy powder or (ii) a magnesium-nickel alloy whose surface is coated with an aluminum material to an anodization treatment by way of applying a prescribed voltage between any of said electrode (i) or said magnesium-nickel alloy (ii) as a positive electrode and a counter electrode in an electrolyte solution, or by coating (a) a magnesium-nickel alloy powder or (b) an electrode formed using a magnesium-nickel alloy powder by an ionomer-containing polymer, wherein if necessary, the surface of said magnesium-nickel alloy powder (a) having said ionomer-containing polymer coated thereon is further coated by another ionomer-containing polymer.

The process makes it possible to relatively easily form an anode using an inexpensive starting material. This situation enables one to produce a high performance alkali rechargeable battery at a reasonable production cost.

BRIEF DESCRIPTION OF THE DRAWINGS

FIG. 8 shows an X-ray diffraction chart of an amorphous phase-containing magnesium-nickel alloy powder after the immersion treatment in an electrolyte solution, obtained in Example 9 which will be described later.

DESCRIPTION OF THE INVENTION AND PREFERRED EMBODIMENTS

Figure 1:
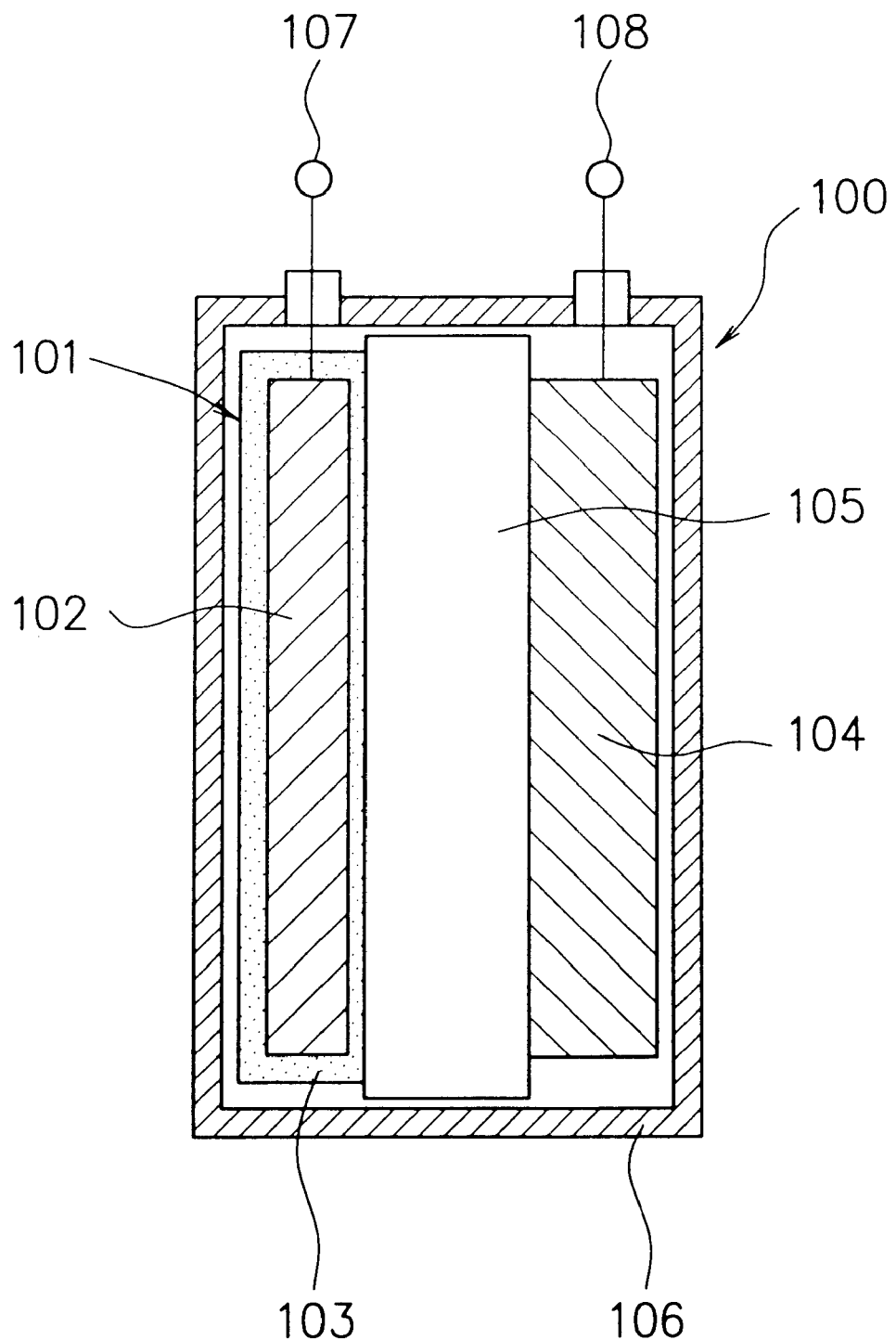
FIG. 1 is a schematic cross-sectional view illustrating an example of an alkali rechargeable battery of the present invention.

The present invention attains the above objects and provides a high performance alkali rechargeable battery having an improved charge-and-discharge capacity and a prolonged cycle life (a prolonged charging and discharging cycle life) and a process for producing said rechargeable battery.

A typical embodiment of the rechargeable battery provided according to the present invention comprises at least an anode, a cathode, and an electrolyte or an electrolyte solution, said anode principally comprising a magnesium-nickel alloy capable of absorbing and storing hydrogen therein and releasing the hydrogen stored therein in the electrochemical reaction, wherein said magnesium-nickel alloy constituting said anode has a surface having a coat layer provided thereon, said coat layer comprising an insulating material which is not dissolved in an aqueous solution of a hydroxide of an alkali metal as said electrolyte solution, which restrains a reaction which forms a magnesium hydroxide when said magnesium-nickel alloy contacts with said aqueous alkali solution, and which allows hydrogen or hydrogen ion to pass therethrough. Said insulating material constituting said coat layer can include hydrous oxides, hydroxides, and ionomer-containing polymers, which satisfy said requirements for said insulating material.

In the rechargeable battery of the present invention, because of the presence of the coat layer comprising such specific material as above described, the magnesium-nickel alloy constituting the anode is prevented from directly contacting with and reacting with the aqueous alkali solution as the electrolyte solution, whereby the high hydrogen-absorbing and storing performance of the magnesium-nickel alloy which contains amorphous phases by nature is prevented from being deteriorated. This situation makes the rechargeable battery have an improved charge-and-discharge capacity and a prolonged cycle life.

The present invention provides a process for producing the above-described rechargeable battery. The process includes the following three embodiments.

A first embodiment is characterized in that the anode of the rechargeable battery is formed by coating a magnesium-nickel alloy as a principal constituent of said anode using at least an aluminum material.

A second embodiment is characterized in that the anode of the rechargeable battery is formed by providing (i) an electrode formed using a magnesium-nickel alloy powder or (ii) a magnesium-nickel alloy whose surface is coated with an aluminum material, and subjecting said electrode (i) or said magnesium-nickel alloy (ii) to an anodization treatment by way of applying a prescribed voltage between said electrode (i) or said magnesium-nickel alloy (ii) as a positive electrode and a counter electrode in an electrolyte solution.

A third embodiment is characterized in that the anode of the rechargeable battery is formed by (a) a method of coating a magnesium-nickel alloy powder by an ionomer-containing polymer, (b) a method of coating a magnesium-nickel alloy powder by an ionomer-containing polymer and coating the surface of an electrode formed using said magnesium-nickel alloy powder having said ionomer-containing polymer coated thereon by another ionomer-containing polymer, or (c) a method of coating an electrode formed using a magnesium-nickel alloy powder by an ionomer-containing polymer.

The process according to the present invention makes it possible to relatively easily form a desirable anode for an alkali rechargeable battery using an inexpensive starting material. This situation enables one to produce a high performance alkali rechargeable battery at a reasonable production cost.

In the following, the present invention will be described in more detail while referring to the drawings.

A principal feature of the present invention resides in the anode of an alkali rechargeable battery.

The anode comprises at least a magnesium-nickel alloy powder preferably containing amorphous phases therein (this magnesium-nickel alloy will be hereinafter referred to simply as "magnesium-nickel alloy powder") as an anode active material and a collector, and said magnesium-nickel alloy powder is arranged said collector or it is arranged on, for example, an expanded metal or a punching metal as the collector so as to fill the openings of said expanded metal or said punching metal. In any case, said magnesium-nickel alloy powder may be added with an electrically conductive auxiliary in order to improve the electric conductivity or additionally with a binder in order to facilitate the arrangement of the magnesium-nickel alloy powder. In more detail, in the anode of the present invention, the surface of the magnesium-nickel alloy powder as the anode active material is covered by a specific insulating material which is insoluble in an aqueous alkali solution comprising a hydroxide of an alkali metal dissolved in water as the electrolyte solution of the rechargeable battery and prevents a magnesium hydroxide from being produced which will be produced when the magnesium-nickel alloy powder is contacted with the aqueous alkali solution, or the surface of the anode which comprises the magnesium-nickel alloy powder and the collector is covered by said insulating material.

An embodiment in that the magnesium-nickel alloy powder whose surface is covered by aforesaid specific insulating material is mixed with an electrically conductive auxiliary and using this mixture, an electrode material layer is formed on the collector, is corresponding to that shown in FIG. 2 which will be described later.

Now, FIG. 1 is a schematic cross-sectional view illustrating the constitution of an example of an alkali rechargeable battery of the present invention. In FIG. 1, reference numeral 100 indicates the entirety of said rechargeable battery. Reference numeral 101 indicates an anode comprising an electrode 102 (comprising an anode active material which comprises a magnesium-nickel alloy preferably containing amorphous phases) having a coat layer 103 to cover the surface of the electrode 102, and reference numeral 104 a cathode. Reference numeral 105 indicates an ion conductor which is disposed between the anode 101 and the cathode 104. Reference numeral 106 indicates a battery housing in which a body comprising the anode 101 (comprising the electrode 102 and the coat layer 103)/the ion conductor 104/the cathode 104 is installed. Reference numeral 107 indicates an anode terminal extending from the electrode 102, and reference numeral 108 a cathode terminal extending from the cathode 104.

Figure 2:
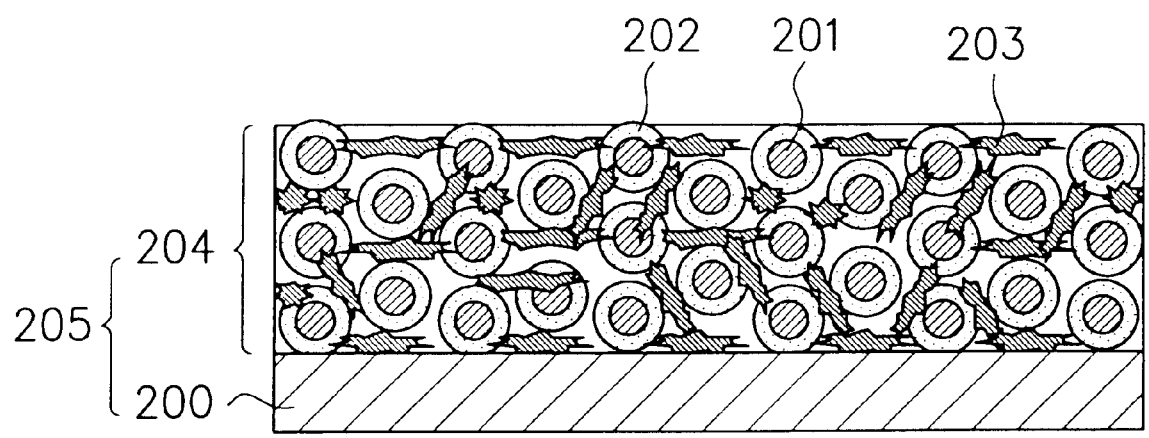
FIG. 2 is a schematic cross-sectional view illustrating an example of an electrode structural body used as the anode of an alkali rechargeable battery of the present invention.

FIG. 2 is a schematic cross-sectional view illustrating an example of an electrode structural body used as the anode of an alkali rechargeable battery of the present invention. In FIG. 2, reference numeral 205 indicates the entirety of said electrode structural body. Reference numeral 200 indicates a collector, reference numeral 204 an electrode material layer formed on the collector 200. Reference numeral 201 indicates a magnesium-nickel alloy powder preferably containing amorphous phases (this magnesium-nickel alloy powder will be hereinafter referred to as "magnesium-nickel alloy powder"), reference numeral 202 a coat layer, and reference numeral 203 an electrically conductive auxiliary.

In FIG. 2, the electrode material layer 204 is provided only on one side of the collector 200. This is not limitative. It is possible for the electrode material layer 204 to be provided on each of the opposite sides of the collector 200 depending upon the situation involved.

The electrode structural body 205 shown in FIG. 2 is formed by forming an electrode material layer 204 on a given collector 200, where the electrode material layer 204 comprises a plurality of bodies comprising a magnesium-nickel alloy powder 201 whose surface is covered by a coat layer 202 which are spacedly distributed together with electrically conductive auxiliaries 203 therein so that each magnesium-nickel alloy powder 201 has an electrical continuity with the collector 200 through the corresponding electrically conductive auxiliary 203.

The coat layer 202 (103 in FIG. 1) comprises a specific insulating material which is not dissolved in an aqueous alkali solution comprising a hydroxide of an alkali metal dissolved in water as the electrolyte solution of the rechargeable battery and stable to said aqueous alkali solution, which restrains a reaction which produces a magnesium hydroxide when said magnesium-nickel alloy contacts with said aqueous alkali solution, and which allows hydrogen or hydrogen ion to pass therethrough. Said insulating material constituting said coat layer can include hydrous oxides, hydroxides, and iomomer-containing polymers, which satisfy said requirements for said insulating material.

By using the electrode structural body 205 as the anode of an alkali rechargeable battery having such configuration shown in FIG. 1, there can be attained a high performance alkali rechargeable battery having a high charge-and-discharge capacity in which the electrode (the anode active material comprising the magnesium-nickel alloy powder) is prevented from being directly contacted with the electrolyte solution (the aqueous alkali solution) to case a magnesium hydroxide and the hydrogen-absorbing and storing performance of the magnesium-nickel alloy powder is prevented from being deteriorated.

In the following, description will be made of each constituent of the rechargeable battery of the present invention.

Anode

A principal feature of the present invention resides in the anode (101 in FIG. 1, 205 in FIG. 2) used in an alkali rechargeable battery (100, see FIG. 1).

The anode comprises a magnesium-nickel alloy (or a magnesium-nickel alloy powder) whose surface is covered by a coat layer comprising a specific insulating material selected from a group consisting of a hydrous oxide, a hydroxide, and an ionomer-containing polymer, which are insoluble in an aqueous alkali solution comprising a hydroxide of an alkali metal dissolved in water as the electrolyte solution of the rechargeable battery and stable to said aqueous alkali solution, which restrain a reaction which produces a magnesium hydroxide when said magnesium-nickel alloy contacts with said aqueous alkali solution, and which allow hydrogen or hydrogen ion to pass therethrough. The coat layer functions to prevent the magnesium-nickel alloy as the anode active material from directly contacting with the aqueous alkali solution as the electrolyte solution to cause a reaction between them to produce a magnesium hydroxide and to prevent the hydrogen-absorbing and storing performance of the magnesium-nickel alloy from being deteriorated. This situation makes it possible to produce a high performance alkali rechargeable battery having a high charge-and-discharge capacity and a prolonged cycle life (a prolonged charging and discharging cycle life).

The coat layer is desired to be made such that it has a substantial thickness preferably in a range of from 5 nm to 1 μm, or more preferably in a range of from 10 nm to 0.5 μm.

Upon charging, a hydrogen ion receives an electron in the vicinity of the anode collector or the electrically conductive auxiliary to convert into a hydrogen in the atomic or molecular state, which passes through the coat layer into the magnesium-nickel alloy as the anode active material, where the hydrogen is stored in the anode active material as a metalhydride. When the substantial thickness of the coat layer is beyond 1 μm, the coating layer does not allow the hydrogen to smoothly pass therethrough upon charging, and because of this, particularly in the case of charging a large quantity of electricity at an increased current density, the quantity of the hydrogen stored in the anode active material is decreased, resulting in a decrease in the discharge capacity.

The magnesium-nickel alloy constituting the anode is preferred to comprise a magnesium-nickel alloy powder containing amorphous phases therein (this magnesium-nickel alloy powder will be hereinafter referred to as "amorphous phase-containing magnesium-nickel alloy powder") having an excellent hydrogen-absorbing and storing performance.

Such amorphous phase-containing magnesium-nickel alloy powder may be prepared, for instance, by a method of mixing a $Mg_2Ni$ alloy powder obtained by means of a high frequency fusion method or the like with a Ni powder to obtain a mixture and processing said mixture by means of a grinding machine such as a planetary ball mill or a vibration mill. Besides, the amorphous phase-containing magnesium-nickel alloy powder may be prepared by means of an atomizing method or sputtering.

Whether or not a given magnesium-nickel alloy powder contains amorphous phases may be confirmed in accordance with X-ray diffraction analysis, where in the case where an X-ray diffraction chart with a broad peak or a X-ray diffraction chart with no distinct peak is afforded, it is confirmed that said magnesium-nickel alloy powder contains amorphous phases, namely, said magnesium-nickel alloy powder is an amorphous phase-containing magnesium-nickel alloy powder. Besides, whether or not a given magnesium-nickel alloy powder contains amorphous phases may be confirmed in accordance with electron beam diffraction analysis, where in the case where a halo pattern is afforded, it is confirmed that said magnesium-nickel alloy powder contains amorphous phases, namely, said magnesium-nickel alloy powder is an amorphous phase-containing magnesium-nickel alloy powder.

Figure 6:
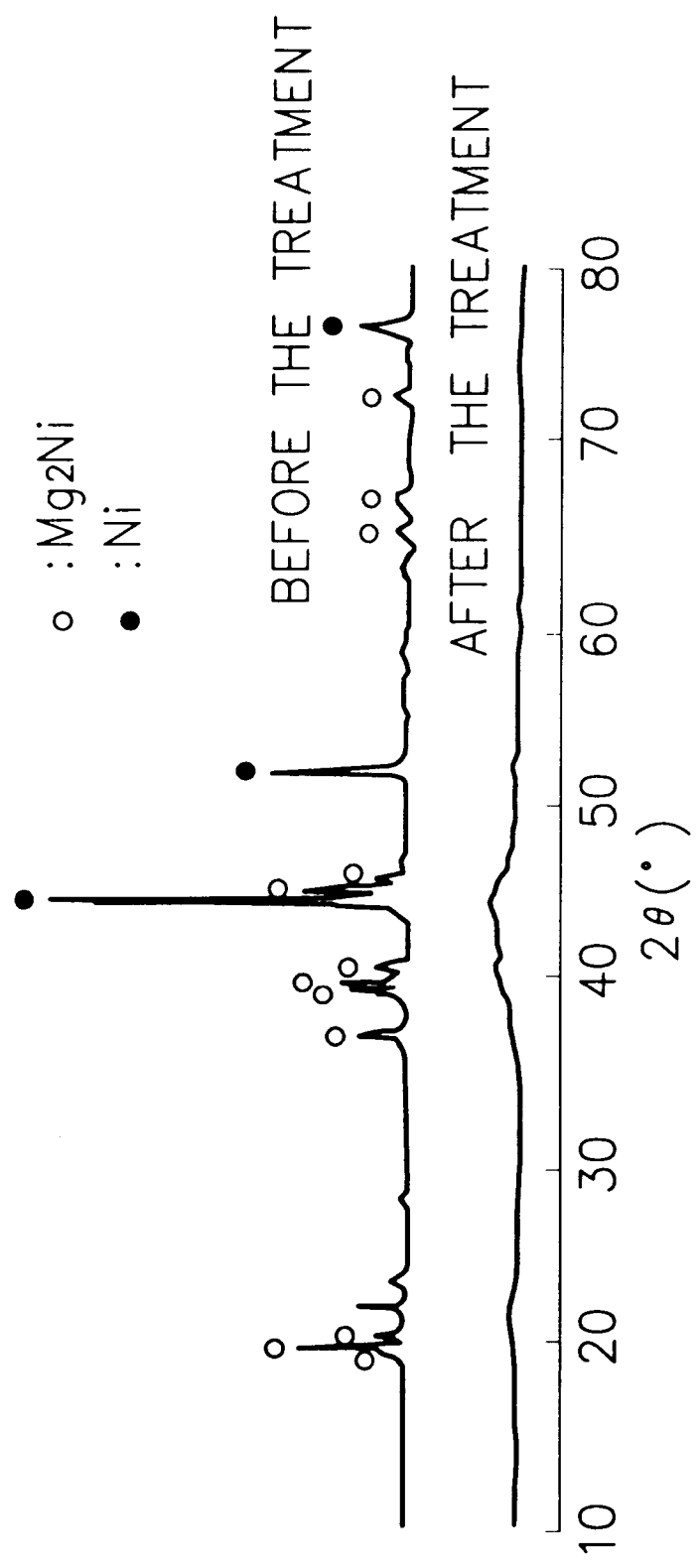
FIG. 6 shows an X-ray diffraction chart of an amorphous phase-containing magnesium-nickel alloy power obtained in Example 1 which will be described later and an X-ray diffraction chart of a starting magnesium-nickel alloy power obtained in Example 1 before amorphization.

FIG. 6 shows an X-ray diffraction pattern of an example of a mixture composed of a $Mg_2Ni$ alloy powder obtained by means of a high frequency fusion method and a Ni powder prior to subjecting to a grinding treatment ("before the treatment" is mentioned in FIG. 6) and an X-ray diffraction pattern of an example of an amorphilized magnesium-nickel alloy powder obtained by subjecting said mixture to a grinding treatment by means of a planetary ball mill ("after the treatment" is mentioned in FIG. 6).

The coat layer which covers the surface of aforesaid amorphous phase-containing magnesium-nickel alloy powder as the anode active material functions to prevent the magnesium-nickel alloy powder from directly contacting with the aqueous alkali solution as the electrolyte solution to cause a reaction between them which produces a magnesium hydroxide and to prevent the hydrogen-absorbing and storing performance of the magnesium-nickel alloy powder from being deteriorated.

The coat layer may comprise a material selected from a group consisting of hydrous oxides represented by the general formula $Mg_yA_zO_x \cdot nH_2O$ and hydroxides represented by the general formula $Mg_yA_z(OH)_x$, where A is one or more elements selected from a group consisting of Al, In, Si, Ge, Ca, Sr, Ti, Zr, Hf, Y, Zn, Fe, Cr, Li, Na and K; n is >zero; and each of x, y, and z is $\leq 1$.

Alternatively, the coat layer may comprise a material selected from a group consisting of hydrous oxides and hydroxides respectively comprising Mg and Al, hydrous oxides and hydroxides respectively comprising Mg and Si, and hydrous oxides and hydroxides respectively comprising Mg, Al and Si.

Further, the coat layer may comprise a material selected from a group consisting of (i) composite compounds comprising such hydrous oxide and having a molecular structure containing one or more salts selected from a group consisting of carbonates, nitrates, sulfates, phosphates, chlorides, and fluorides, and (ii) composite compounds comprising such hydroxide and having a molecular structure containing one or more salts selected from a group consisting of carbonates, nitrates, sulfates, phosphates, chlorides, and fluorides Such composite compounds (i) can be represented by the general formula $Mg_yA_zO_x \cdot (CO_3)_a \cdot (NO_3)_b \cdot (SO_4)_c \cdot (PO_4)_d \cdot Cl_e \cdot F_f \cdot nH_2O$. Such composite compounds (ii) can be represented by the general formula $Mg_yA_z(OH)_x \cdot (CO_3)_a \cdot (NO_3)_b \cdot (SO_4)_c \cdot (PO_4)_d \cdot Cl_e \cdot F_f$. In these two general formulas, A is one or more elements selected from a group consisting of Al, In, Si, Ge, Ca, Sr, Ti, Zr, Hf, Y, Zn, Fe, Cr, Li, Na and K; n is >zero; and each of x, y, and z is $\geq 1$. And all of a, b, c, d, e, and f may be >zero or one or more of them may be zero.

Besides, the coat layer may comprise a material selected from a group consisting of ionomer-containing polymers.

In any case, the material constituting the coat layer is preferred to contain amorphous phases.

A principal feature of the present invention is that an amorphous phase-containing magnesium-nickel alloy powder as the principal constituent of the anode is provided with a specific coat layer on the surface thereof, said coat layer comprising a specific insulating material selected from a group consisting of the above-mentioned hydrous oxides, the above-mentioned hydroxides, and ionomer-containing polymers which are capable of preventing the magnesium-nickel alloy powder from contacting with and reacting with an aqueous alkali solution comprising a hydroxide of an alkali metal dissolved in water as the electrolyte solution of the rechargeable battery to produce a magnesium hydroxide.

In the following, description will be made of the formation of an anode of the present invention.

(1) The anode of the present invention may be formed by coating an amorphous phase-containing magnesium-nickel alloy powder using an aluminum material to obtain an electrode structural body comprising said magnesium-nickel alloy powder whose surface is covered by a coat layer comprising said aluminum material as said anode. In this case, said coat layer is not insulative as it is, but when the coat layer (comprising the aluminum material in contact with the magnesium-nickel alloy) of the electrode structural body is contacted with aforesaid aqueous alkali solution used as the electrolyte solution of the rechargeable battery, it is reacted with the aqueous alkali solution to convert into a coat layer comprising a hydrous oxide or hydroxide containing magnesium (Mg) and aluminum (Al). This hydrous oxide or hydroxide constituting the coat layer is insoluble in the aqueous alkali solution as the electrolyte solution and functions to prevent the magnesium-nickel alloy from contacting with and reacting with the aqueous alkali solution as the electrolyte solution to produce a magnesium hydroxide and allow hydrogen or hydrogen ion to pass therethrough.

Now, in order to coat an aluminum material over an amorphous phase-containing magnesium-nickel alloy powder to form an electrode structural body as the anode of the present invention, there can be adopted any of the following two methods (a) and (b).

Method (a)

An amorphous phase-containing magnesium-nickel alloy powder is subjected to a surface treatment together with at least a powdery aluminum material using a planetary ball mill or a vibration mill to obtain an electrode structural body comprising said amorphous phase-containing magnesium-nickel alloy powder whose surface is covered by said powdery aluminum material.

The surface treatment in this case is preferred to be conducted under such condition that the revolution speed or the vibration frequency is refrained or the treating time is refrained and that is gentler than the amorphization condition by means of said planetary ball mill or said vibration mill (that is, the mechanical grinding condition or the mechanical alloying condition).

Method (b)

An aluminum material is deposited on the surface of an amorphous phase-containing magnesium-nickel powder by means of vacuum evaporation to obtain an electrode structural body comprising said magnesium-nickel alloy powder whose surface is covered by said aluminum material.

For the electrode structural body comprising the amorphous phase-containing magnesium-nickel alloy powder whose surface is covered by the aluminum material obtained by the method (a) or (b), when it is contacted with the aqueous alkali solution as the electrolyte solution used in the rechargeable battery through the aluminum material which is in contact with the magnesium-nickel alloy powder, it is reacted with the aqueous alkali solution as the electrolyte solution to form a coat layer comprising a hydrous oxide or hydroxide containing magnesium and aluminum. In this case, it is possible for the aqueous alkali solution as the electrolyte solution to contain an appropriate aluminate in a prescribed amount. Preferable specific examples of such aliminate are potassium aluminates and sodium aluminates which are represented by the general formula $xM_2O \cdot yAl_2O_3 \cdot zH_2O$, with M being potassium element (K) or sodium element (Na), each of x, y and z being an integer, where z may be zero.

Thus, there is formed an electrode structural body comprising the amorphous phase-containing magnesium-nickel alloy powder whose surface is covered by the coat layer comprising the hydrous oxide or hydroxide.

In order to facilitate the formation of the coat layer on the surface of the amorphous phase-containing magnesium-nickel alloy powder, it is preferred to subject an alkali rechargeable battery in which the electrode structural body is installed as the anode to a heat treatment at a temperature in a range of from 40 to 90° C.

Separately, for the electrode structural body comprising the amorphous phase-containing magnesium-nickel alloy powder whose surface is covered by the powdery aluminum material, it is possible to convert said powdery aluminum material into a coat layer comprising a hydrous oxide or hydroxide which covers the surface of said magnesium-nickel alloy powder by subjecting the powdery aluminum material situated on the surface of the magnesium-nickel alloy powder to an oxidation treatment by means of pressurized steam in a pressure vessel, whereby converting said powdery aluminum material into said coat layer comprising said hydrous oxide or hydroxide.

Similarly, in the case of an electrode structural body comprising the amorphous phase-containing magnesium-nickel alloy powder whose surface having no powdery aluminum material, by subjecting the surface of said amorphous phase-containing magnesium-nickel alloy powder to an oxidation treatment by means of pressurized steam in a pressure vessel to oxidize said surface, it is possible to make said amorphous phase-containing magnesium-nickel alloy powder have a coat layer comprising a hydrous oxide or hydroxide so as to cover the surface thereon.

Now, as a specific example of preparing an electrode structural body having such configuration as shown in FIG. 2 as the anode of the present invention in accordance with the foregoing method (a), there can be mentioned such embodiment as will be described below.

A given amorphous phase-containing magnesium-nickel alloy powder is subjected to a surface treatment together with at least a powdery aluminum material by means of a planetary ball mill or a vibration mill under such condition as described in the above method (a) to obtain a powdery material comprising said amorphous phase-containing magnesium-nickel alloy powder whose surface is coated by said powdery aluminum material, said powdery material is mixed with an electrically conductive auxiliary and additionally a binder if necessary, followed by forming an electrode material layer comprising said powdery material mixed with said electrically conductive auxiliary and said binder (which is used if required) on the surface of a given anode collector, whereby an electrode structural body such configuration as shown in FIG. 1 is obtained. This electrode structural body as it is can be installed in a battery housing as the anode of an alkali rechargeable battery.

It is possible that the electrode structural body is immersed in a reaction solution comprising an aqueous alkali solution or the like to convert the aluminum material situated on the surface of the magnesium-nickel alloy powder into a coat layer comprising a hydrous oxide or hydroxide, and thereafter, the electrode structural body is installed in the battery housing as the anode of the alkali rechargeable battery. Alternatively, it is possible that aforesaid powdery material comprising the amorphous phase-containing magnesium-nickel alloy powder whose surface is coated by the powdery aluminum material is treated by immersing it in aforesaid reaction solution to convert the aluminum material situated on the surface of the magnesium-nickel alloy powder into a coat layer comprising a hydrous oxide or hydroxide, and using a product thus obtained, an electrode material layer is formed on the surface of a given anode collector, whereby an electrode structural body is obtained.

As such reaction solution used in the above, there can be mentioned solutions containing one or more salts selected from a group consisting of sodium hydroxide, potassium hydroxide, lithium hydroxide, calcium hydroxide, sodium bicarbonate, sodium chloride, calcium chloride, magnesium chloride, aluminum chloride, zirconium trichloride, zirconium tetrachloride, titanium trichloride, titanium tetrachloride, iron trichloride, sodium sulfate, magnesium sulfate, lithium nitrate, potassium nitrate, sodium nitrate, sodium silicate, sodium fluoride, sodium phosphate, and potassium chromate. These solutions may be aqueous solutions or alcohol solutions. The treatment using any of these reaction solution is preferred to be conducted at a temperature in a range of from 40 to 100° C. By way of the treatment of immersing in any of the above reaction solutions, there can be formed a composite hydrous oxide layer or a composite hydroxide layer respectively having a molecular structure containing one or more salts selected from carbonate, nitrate, sulfate, phosphate, chloride, and fluoride on the surface of the amorphous phase-containing magnesium-nickel alloy powder.

Separately, it is possible to directly form a coat layer comprising a desired hydrous oxide or a desired hydroxide on the surface of the amorphous phase-containing magnesium-nickel alloy powder so as to cover said surface.

(2) The anode of the present invention may be also formed by way of anodization, for instance, in the following manner. That is, an electrode formed using an amorphous phase-containing magnesium-nickel alloy powder or an amorphous phase-containing magnesium-nickel alloy powder whose surface is covered by a powdery aluminum material is positioned in a prescribed electrolyte solution as a positive electrode so as to oppose a counter electrode also positioned in said electrolyte solution, and a desired voltage is applied between the two electrodes to subject the positive electrode to an anodization treatment, whereby on the surface of the amorphous phase-containing magnesium-nickel alloy powder, there is formed a desired hydrous oxide layer or a desired hydroxide layer which is insoluble in the aqueous alkali solution as the electrolyte solution used in an alkali rechargeable battery and which functions to prevent the magnesium-nickel alloy powder from directly contacting with and reacting with the aqueous alkali solution to produce a magnesium hydroxide and to allow hydrogen or hydrogen ion to pass therethrough. Thus, there is obtained an electrode structural body comprising the amorphous phase-containing magnesium-nickel alloy whose surface is covered by the hydrous oxide layer or the hydroxide layer as the anode of the present invention.

As preferable specific examples of such electrolyte solution used in the anodization treatment, there can mentioned a mixed aqueous solution comprising KOH, KF, $Na_3PO_4$, $Al(OH)_3$, and deionized water, and a mixed aqueous solution comprising $(NH_4)_2SO_4$, $K_2Cr_2O_7$, aqueous ammonia, and deionized water.

(3) The anode of the present invention may be also formed by any of the following methods(i) to (iii).

Method (i)

An amorphous phase-containing magnesium-nickel alloy powder is coated by an ionomer-containing polymer to obtain a powdery material comprising said magnesium-nickel alloy powder whose surface is covered by a coat layer comprising said ionomer-containing polymer. And using said powdery material, if necessary, together with an electrically conductive auxiliary or/and a binder, an electrode material layer is formed on a given anode collector, whereby an electrode structural body as the anode is obtained.

Method (ii)

An amorphous phase-containing magnesium-nickel alloy powder is coated by an ionomer-containing polymer such that the surface of said magnesium-nickel alloy powder is covered by a coat layer comprising said ionomer-containing polymer, and coating an electrode formed using said magnesium-nickel alloy powder whose surface is covered said ionomer-containing polymer by another ionomer-containing polymer, whereby an electrode structural body as the anode is obtained.

Method (iii)

An electrode formed by using at least an amorphous phase-containing magnesium-nickel alloy powder is coated by an ionomer-containing polymer such that the surface of said electrode is covered by a coat layer comprising said ionomer-containing polymer, to obtain an electrode structural body comprising said electrode whose surface is covered by said coat layer as the anode.

The ionomer-containing polymer used in any of the methods (i) to (iii) can include ionomers having a covalent bond and an ionic bond. Such ionomer includes those based on copolymers comprising a covalent bond-forming monomer and an ionic bond-forming monomer. The covalent bond-forming monomer can include methymethacrylate, acrylonitrile, and the like. The ionic bond-forming monomer can include acrylic acid, methacrylic acid, vinyl sulfonic acid, styrene sulfonic acid, and the like.

Specifically, the ionomer-containing polymer can include ionomers obtained by a manner of polymerizing such covalent bond-forming monomer and such ionic bond-forming monomer to form a copolymer and neutralizing said copolymer with an alkali such as sodium hydroxide, potassium hydroxide, or lithium hydroxide. The ionomer-containing polymer can also include gelled ionomers obtained by adding a crosslinking agent having two or more unsaturated bonds in its molecular at the time of polymerizing the covalent bond-forming monomer and the ionic bond-forming monomer in the above manner. The crosslinking agent used in this case includes divinyl compounds and trivinyl compounds such as N,N'-methylene-bisacrylamide, ethylene glycol dimethacrylate, tetraethylene glycol dimethacrylate, 1,4-butanediol diacrylate, pentadecanediol diacrylate, and the like.

Of the foregoing ionomer-containing polymers, those which are insoluble in or not reactive with the aqueous alkali solution as the electrolyte solution used in the rechargeable battery are preferred. And crosslinked hydrophilic ionomer-containing polymers are more preferred.

The formation of the coat layer on the surface of an object (that is, aforesaid amorphous phase-containing magnesium-nickel powder or aforesaid electrode) so as to cover said surface using such ionomer-containing polymer may be conducted by a manner of depositing said polymer by way of sputtering, a manner of applying a fused liquid of said polymer or a solution of said polymer dissolved in a solvent, or a manner wherein a coating composition comprising a given covalent bond-forming monomer and a given ionic bond-forming monomer is applied, followed by subjecting to polymerization.

Upon forming the anode of the present invention using a given amorphous phase-containing magnesium-nickel alloy powder or a powdery material comprising a given amorphous phase-containing magnesium-nickel alloy powder whose surface is covered by a given coating material, it is possible to add an appropriate electrically conductive auxiliary or/and a binder to said alloy powder or said powdery material if required.

Such electrically conductive auxiliary can include amorphous carbon materials such as acetylene black, ketjen black, and the like, carbonous materials such as graphite structure carbon, and the like, and metallic materials such as Ni, Cu, Ag, In, Sn, and the like. The electrically conductive auxiliary is preferred to be in a flake form, a spherical form, a filament form, a needle form, a fabric form, or a spike form.

As the binder, it is preferred to use an organic polymer which is stable against an electrolyte solution comprising an aqueous alkali solution used in an alkali rechargeable battery. Specific examples of such organic polymer are polyvinyl alcohol, polyolefins such as polyethylene, polypropylene, and the like, fluororesins such as polyvinylidene fluoride, tetrafluoroethylene, and the like, and celluloses such as methyl cellulose, carboxymethyl cellulose, and the like.

As the collector (200, see FIG. 2) on which an electrode material whose principal component comprising a prescribed amorphous phase-containing magnesium-nickel alloy powder is provided, there can be mentioned, for example, a metal foam member obtained by coating the surface of a sheet-shaped organic polymer resin having a three dimensional network structure of urethane foam with a metal film of nickel or the like by means of plating or the like and subjecting the resultant to sintering to decompose and remove the polymer resin, a metal foam member obtained by coating the surface of a carbon fiber felt with a metal film of nickel or the like by means of plating or the like, a unwoven metallic fiber member made of nickel or the like, a sintered member obtained by sintering a nickel fine powder, a punching metal member or an expanded metal member such as a nickel-plated steel member having a plurality of perforations, a nickel foil, and a nickel-plated metal foil.

Cathode

The cathode (104, see FIG. 1) comprises a cathode active material and a collector. The cathode active material may comprise a material selected from a group consisting of nickel hydroxide, manganese dioxide, and air. In the case where the cathode active material is air, there is used a catalyst comprising a carbon material and a transition metal or a transition metal oxide as the cathode active material.

The cathode may be prepared by forming a cathode material layer on a collector using such cathode active material, if necessary by adding an appropriate electrically conductive auxiliary or/and an appropriate binder.

Specifically, in the case of preparing the cathode whose active material comprising nickel hydroxide, there can be adopted a manner of mixing a nickel hydroxide powder with a binder to obtain a mixture, mixing the mixture with a solvent to obtain a slurry, and filling the slurry into a porous collector to obtain a cathode, or a manner of directly bonding a nickel hydroxide powder onto a collector using a binder to obtain a cathode. Besides, there can be also adopted a manner of mixing a nickel hydroxide powder with a solution comprising a binder dissolved in a solvent to obtain a slurry, applying said slurry onto a nickel-plated steel member having a plurality of perforations, sintering said nickel-plated steel member coated with said slurry to obtain a sintered nickel substrate, immersing said sintered nickel substrate in a nickel salt solution to fill said sintered nickel substrate with a nickel salt, reacting an alkali solution with the nickel salt filled in the sintered nickel substrate to convert the nickel salt into a nickel hydroxide whereby making the sintered nickel substrate filled with said nickel hydroxide. Thus, there is obtained a cathode.

The collector used in the cathode serves to efficiently supply an electric current consumed in or collect an electric current generated in the electrode reaction upon charging or discharging. In this connection, the collector is desired to be constituted by a material which is highly electrically conductive and inactive in the battery reaction.

Specific examples usable as the collector of the cathode are a metal foam member obtained by coating the surface of a sheet-shaped organic polymer resin having a three dimensional network structure of urethane foam with a metal film of nickel or the like by means of plating or the like and subjecting the resultant to sintering to decompose and remove the polymer resin, a metal foam member obtained by coating the surface of a carbon fiber felt with a metal film of nickel or the like by means of plating or the like, a unwoven metallic fiber member made of nickel or the like, a sintered member obtained by sintering a nickel fine powder, a punching metal member or an expanded metal member such as a nickel-plated steel member having a plurality of perforations, a nickel foil, and a nickel-plated metal foil.

The electrically conductive auxiliary which is used if required upon the formation of the cathode can include amorphous carbon materials such as acetylene black, ketjen black, and the like, carbonous materials such as graphite structure carbon, and the like, and metallic materials such as Ni, Cu, Ag, In, Sn, and the like. The electrically conductive auxiliary is preferred to be in a flake form, a spherical form, a filament form, a needle form, a fabric form, or a spike form.

As the binder which is used if required upon the formation of the cathode, it is preferred to use an organic polymer which is stable against an electrolyte solution comprising an aqueous alkali solution used in an alkali rechargeable battery. Specific examples of such organic polymer are polyvinyl alcohol, polyolefins such as polyethylene, polypropylene, and the like, fluororesins such as polyvinylidene fluoride, tetrafluoroethylene, and the like, and celluloses such as methyl cellulose, carboxymethyl cellulose, and the like.

Ion Conductor

The ion conductor (105, see FIG. 1) is preferred to comprise a conducting material capable of allowing hydrogen ion to pass therethrough. Specifically, as such ion conductor, it is possible to use a separator having an electrolyte solution (a supporting electrolyte solution) obtained by dissolving a given electrolyte (a given supporting electrolyte) in an adequate solvent retained therein, a solid electrolyte or a solidified electrolyte obtained by gelling an adequate electrolyte solution by a gelling agent. In the case where said solid electrolyte or said solidified electrolyte is used, any of them can be used as it is or any of them can be used by retaining it in a separator.

The ion conductor used in the rechargeable battery of the present invention is necessary to have an ionic conductivity at 25° C. which is preferably more than $1 \times 10^{-3}$ S/cm or more preferably more than $5 \times 10^{-3}$ S/cm.

The electrolyte (the supporting electrolyte) may comprises a material selected from a group consisting of potassium hydroxide, lithium hydroxide, sodium hydroxide, and mixtures.

In the present invention, an aqueous alkali solution comprising any of said materials as the electrolyte dissolved in water is desirably used as the electrolyte solution.

However, in order to prevent leakage of the electrolyte solution and also in order to prevent the electrolyte solution from reacting with the anode active material (the magnesium-nickel alloy), it is preferred for the electrolyte solution to be solidified by gelling it by a gelling agent even in the case where the electrolyte solution is retained in the separator.

The gelling agent is preferred to comprise a polymer capable of absorbing the electrolyte solution to swell. Such polymer can include polyethylene oxide, polyvinyl alcohol, and polyacrylamide.

The separator having the electrolyte solution retained therein as the ion conductor (105) is disposed between the anode (101) and the cathode (104) as shown in FIG. 1. In this case, the separator serves to prevent the anode and the cathode from suffering from internal-shorts while it serves to retain the electrolyte (the electrolyte solution) therein. The separator is not always necessary to be provided when the solid electrolyte or the solidified electrolyte is used wherein the solid electrolyte or the solidified electrolyte serves as the ion conductor.

In the case where the separator is used, the separator is necessary to have a structure having a number of perforations capable of allowing ions of the electrolyte to pass therethrough and it is also necessary to be insoluble in and stable to the electrolyte solution.

Therefore, the separator is necessary to comprise a member which satisfies these requirements. As such member, there can be mentioned, for example, nonwoven fabrics or membranes having a micropore structure, made of glass, polyolefin such as polypropylene, polyethylene or the like, or fluororesin. Besides, a metal oxide film or a resin film combined with a metal oxide, respectively having a plurality of micropores are also usable. In the case where the separator comprises a member made of polyolefin or fluororesin, said member is desired to have been applied with hydrophilic treatment. The hydrophilic treatment includes plasma irradiation treatment using hydrogen plasma, oxygen plasma, or fluorine plasma, ozone irradiation treatment, corona discharging treatment, and treatment using chemicals.

Shape and Structure of Rechargeable Battery

The rechargeable battery of the present invention may be in the form of a flat round shape, a cylindrical shape, a prismatic shape, or a sheet-like shape. The structure of the rechargeable battery of the present invention may takes a single layer structure, a spiral-wound cylindrical structure, or the like. In the case where the rechargeable battery is of a spiral-wound cylindrical structure, the anode, separator, and cathode are arranged in the named order and they are spiral-wound and because of this, there are advantages such that the battery area can be increased as desired and a high electric current can be flown upon charging and discharging. In the case where the rechargeable battery is of a prismatic structure or a sheet-like structure, there is an advantage such that the space of a device for housing the rechargeable battery can be effectively utilized.

In the following, the shape and structure of a rechargeable battery of the present invention will be detailed with reference to FIGS. 3 to 5.

Figure 3:
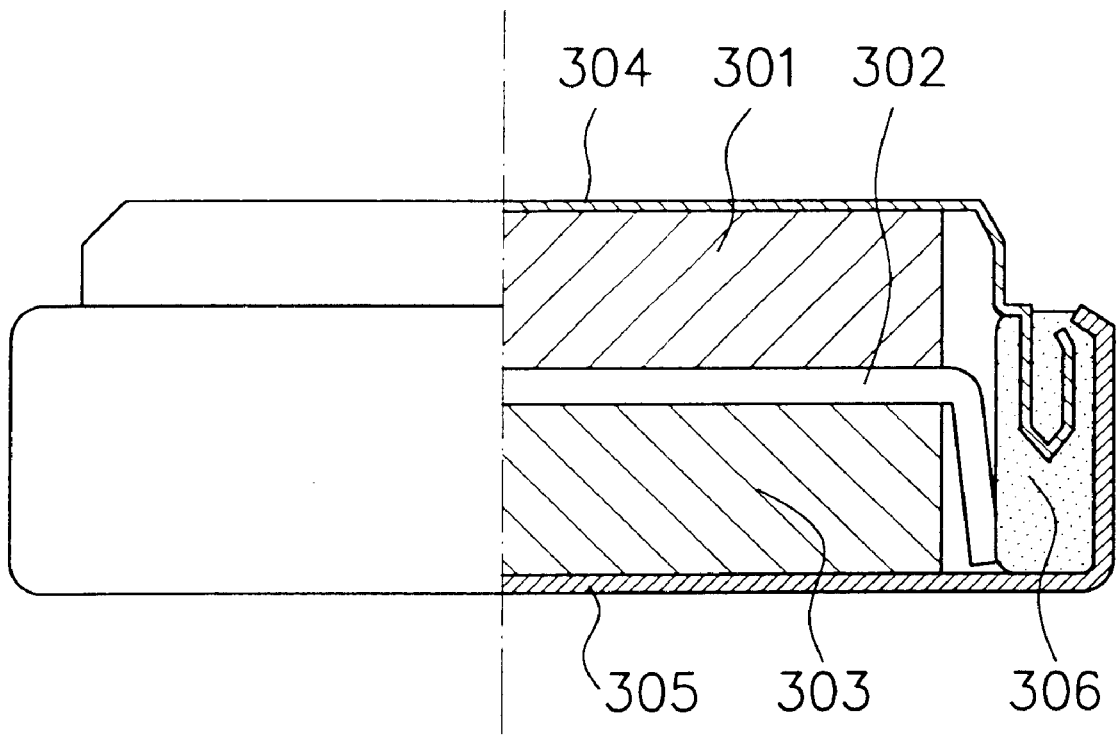
FIG. 3 is a schematic cross-sectional view illustrating an example of a single-layer structure type flat rechargeable battery of the present invention.

FIG. 3 is a schematic cross-sectional view illustrating an example of a single-layer flat round type (coin type) rechargeable battery according to the present invention. FIG. 4 is a schematic cross-sectional view illustrating an example of a spiral-wound cylindrical type rechargeable battery according to the present invention. FIG. 5 is a schematic perspective view illustrating an example of a prismatic rechargeable battery according to the present invention.

Figure 4:
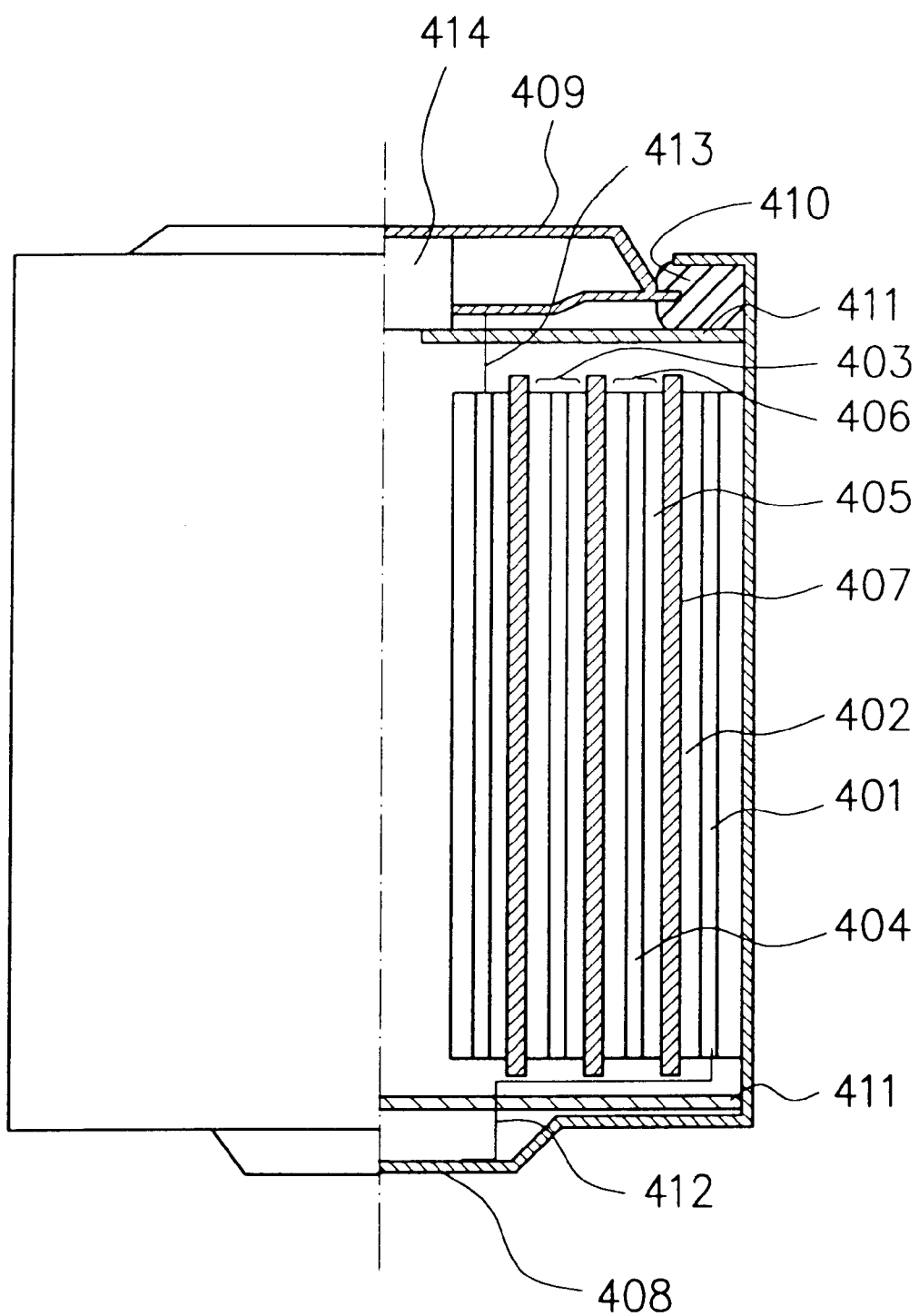
FIG. 4 is a schematic cross-sectional view illustrating an example of a spiral-wound cylindrical rechargeable battery of the present invention.
Figure 5:
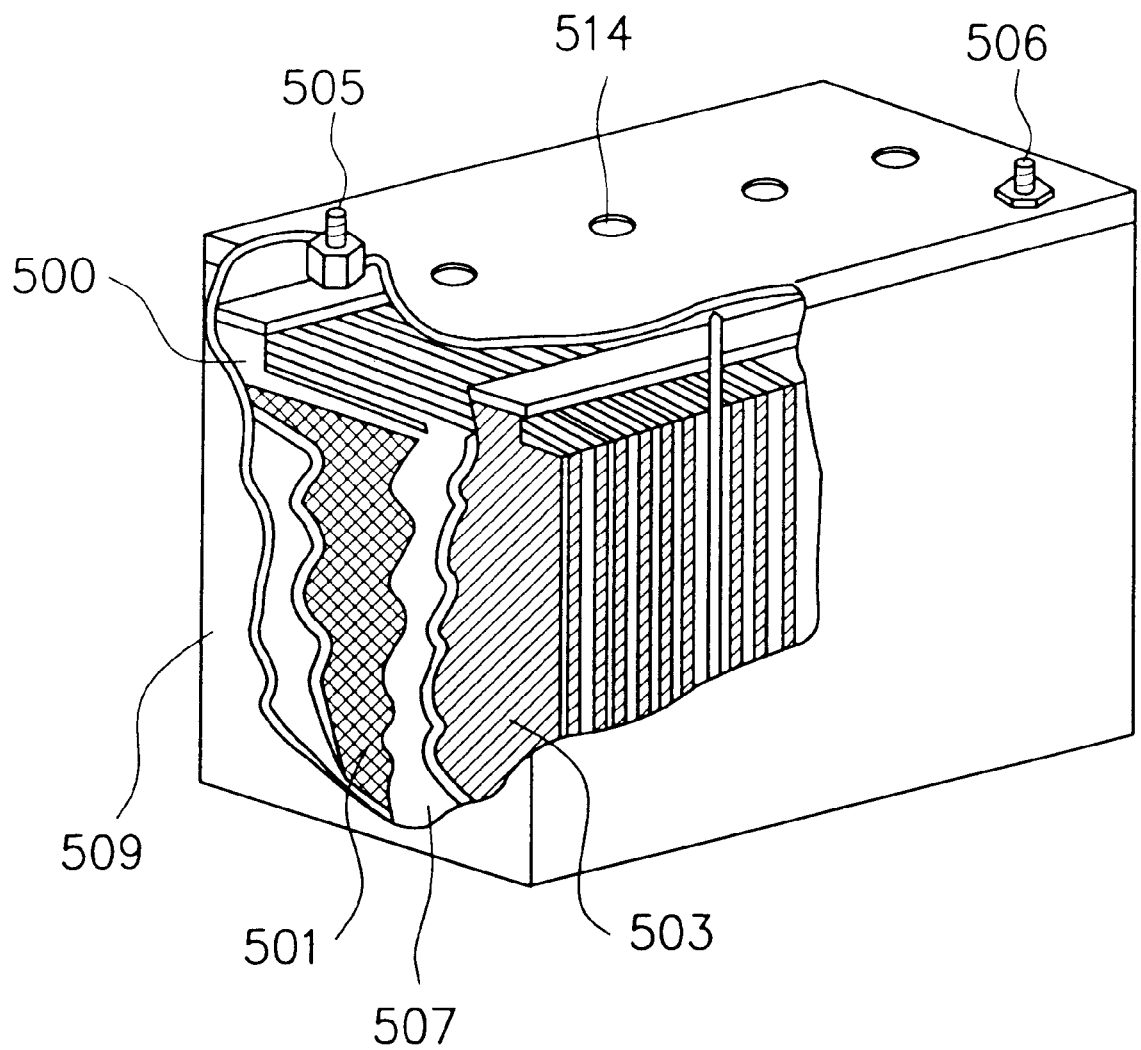
FIG. 5 is a schematic cross-sectional view illustrating an example of a prismatic rechargeable battery of the present invention.

In FIGS. 3 to 5, each of reference numerals 301, 403 and 501 indicates an anode having an anode active material, each of reference numerals 303, 406 and 503 a cathode having a cathode active material, each of reference numerals 304, 408 and 505 an anode terminal (an anode can or an anode cap), each of reference numerals 305, 409 and 506 a cathode terminal (a cathode can or a cathode cap), and each of reference numerals 302, 407 and 507 an ion conductor (a separator with an electrolyte solution).

Each of reference numerals 306 and 410 indicates a gasket, each of reference numerals 401 and 500 an anode collector, reference numeral 404 a cathode collector, and reference numeral 411 an insulating plate. Reference numeral 412 indicates an anode lead, reference numeral 413 a cathode lead, and each of reference numerals 414 and 514 a safety vent. Reference numeral 509 indicates a battery housing (a battery container).

In the flat round type (coin type) rechargeable battery shown in FIG. 3, the cathode 303 having a cathode active material layer and the anode 301 having an anode active material layer are stacked through the ion conductor 302 comprising a separator having at least an electrolyte solution retained therein to form a stacked body, and this stacked body is accommodated in the cathode can 305 as the cathode terminal from the cathode side, where the anode side is covered by the anode cap 304 as the anode terminal. And the gasket 306 is disposed in the remaining space of the cathode can.

In the spiral-wound cylindrical type rechargeable battery shown in FIG. 4, the cathode 406 having a cathode active material layer 405 formed on the cathode collector 404 and the anode 403 having an anode active material layer 402 formed on the anode collector 401 are opposed to each other through the ion conductor 407 comprising a separator having at least an electrolyte solution retained therein, and wound in multiple to form a stacked body having a multi-wound cylindrical structure. The stacked body having the cylindrical structure is accommodated in the anode can 408 as the anode terminal. The cathode cap 409 as the cathode terminal is provided on the opening side of the anode can 408, and the gasket 410 is disposed in the remaining space of the anode can 408. The electrode stacked body of the cylindrical structure is isolated from the cathode cap side through the insulating plate 411. The cathode 406 is electrically connected to the cathode cap 409 through the cathode lead 413. The anode 403 is electrically connected to the anode can 408 through the anode lead 412. The safety vent 414 for adjusting the internal pressure of the battery is provided on the cathode cap side.

In the above, each of the active material layer of the anode 301 and the active material layer 402 of the anode 403 comprises a layer comprising the foregoing amorphous phase-containing magnesium-nickel alloy powder whose surface is covered by the foregoing insulating material layer.

In the following, description will be made of an example of a process for fabricating an alkali rechargeable battery having such configuration as shown in FIG. 3 or FIG. 4.

(1) A combination comprising the separator (302, 407) interposed between the anode (301, 403) and the cathode (303, 406) is positioned in the cathode can (305) or the anode can (408).

(2) The electrolyte is introduced thereinto, and the resultant is assembled with the anode cap (304) or the cathode cap (409) and the gasket (306, 410).

(3) The assembled body obtained in the step (2) is subjected to a caulking treatment, whereby the rechargeable battery is completed.

In the battery production, the preparation of the materials of the rechargeable battery and the assembly of the battery are desired to be conducted in a dry air atmosphere whose moisture having been sufficiently removed or in a dry inert gas atmosphere.

Description will be made of the members used in the fabrication of the above rechargeable battery, except for the anode, the cathode, and the ion conductor including the collector and the electrolyte (the electrolyte solution) since these have been previously described.

Battery Housing

For the battery housing in the rechargeable battery of the present invention, there are a case wherein the output and input terminals together serve also as the battery housing and a case wherein they do not serve as the battery housing.

The configuration of FIG. 3 and that of FIG. 4 correspond the former case. That is, in the case of FIG. 3, the anode cap (304) and the cathode can 305) constitute a battery housing. In the case of FIG. 4, the anode can (408) and the cathode cap (409) constitute a battery housing. Such battery housing comprises a steel plate or a stainless steel plate. Particularly, it preferably comprises a titanium clad stainless steel plate, a copper clad stainless steel plate or a nickel-plated steel plate.

The configuration of FIG. 5 corresponds the latter case. That is, in the case of FIG. 5, the battery housing (the battery container) 509 is independently provided. The battery housing in the case of FIG. 5 comprises a stainless steel, a metallic material of iron or zinc, a plastic material of polypropylene or the like, or a composite material comprising a metallic material or a glass fiber and a plastic material.

Safety Vent

In the rechargeable battery of the present invention, a safety vent (414, 514) may be provided in order to ensure the safety when the internal pressure in the battery is increased. The safety vent may comprise a rubber, a spring, a metal ball or a rupture foil.

Insulating Packing

The gasket (306, 410) in the rechargeable battery of the present invention may be constituted by a fluororesin, a polyamide resin, a polyolefin resin, a polysulfone resin, or a rubber material. The sealing of the battery may be conducted by way of glass-sealing, sealing using an adhesive, welding or soldering, besides the caulking using the insulating packing shown in the case shown in FIG. 3 or FIG. 4.

The insulating plate (411) shown in FIG. 4 may be constituted by a material selected from organic resin materials and ceramics.

In the following, the present invention will be described in more detail with reference to examples. However, the scope of the present invention is not restricted to these examples.

EXAMPLE 1

In this example, there was prepared a coin type alkali rechargeable battery having such configuration as shown in FIG. 3 in the following manner.

1. Preparation of Hydrogen Absorption Alloy

A $Mg_2Ni$ powder of less than 80 meshes in particle size obtained by way of high frequency fusion and grinding and a nickel powder having an average particle size of less than 10 pm were mixed at a mol ratio of 1:1 to obtain a mixture composed of said $Mg_2Ni$ powder and said nickel powder. This mixture was found to have an X-ray diffraction pattern shown in FIG. 6 (see, "before the treatment").

The mixture was subjected to a grinding treatment in an argon gas atmosphere by means of a planetary ball mill at an acceleration of 17 G for 2 hours to obtain a magnesium-nickel alloy powder. This magnesium-nickel alloy powder was found to have an X-ray diffraction pattern shown in FIG. 6 (see, "after the treatment"). Based on this X-ray diffraction pattern, this magnesium-nickel alloy powder was found to have an amorphous structure. Thus, this magnesium-nickel alloy powder will be hereinafter referred to as "amorphous magnesium-nickel alloy powder".

An aluminum powder was admixed to the amorphous magnesium-nickel alloy powder at an atomic ratio of 1:4 in terms of the relation of the aluminum element to the magnesium element of the amorphous magnesium-nickel alloy powder to obtain a mixture. The mixture was subjected to a grinding treatment in an argon gas atmosphere by means of a planetary ball mill at an acceleration of 10 G for 15 minutes to obtain a Mg—Ni—Al composite alloy powder.

A particle specimen of the Mg—Ni—Al composite alloy powder was subjected to elemental analysis with respect to its particle section by means of an X-ray analyzer. As a result, it was found that the aluminum was distributed only in a surface region of the particle specimen.

Separately, a sample of the Mg—Ni—Al composite alloy powder was immersed in a 7 M (mol/liter) KOH (potassium hydroxide) aqueous solution of containing 1 M (mol/liter) of LiOH (lithium hydroxide) [this KOH aqueous solution is corresponding to an electrolyte solution used in an alkali rechargeable battery of the present invention], where the Mg—Ni—Al composite alloy powder sample was reacted with the KOH aqueous solution for 15 hours while maintaining the temperature of the KOH aqueous solution at 60° C. After this, the Mg—Ni—Al composite alloy powder was taken out, and it was washed with pure water, followed by drying. For the Mg—Ni—Al composite alloy powder sample thus treated, using a X-ray diffractometer RINT 2000 (produced by Rikagaku Corporation), wide angle X-ray diffraction analysis using Kα-rays of Cu as a radiation source was conducted. As a result, there was obtained an X-ray diffraction chart shown in FIG. 7. In the X-ray diffraction chart shown in FIG. 7, there was not observed a diffraction peak belonging to magnesium hydroxide ($Mg(OH)_2$) which will be appeared at $2\theta=18.6°$ and at $2\theta=38.0°$. This indicates that no magnesium hydroxide is produced even when the Mg—Ni—Al composite alloy powder is immersed for a long time.

Figure 7:
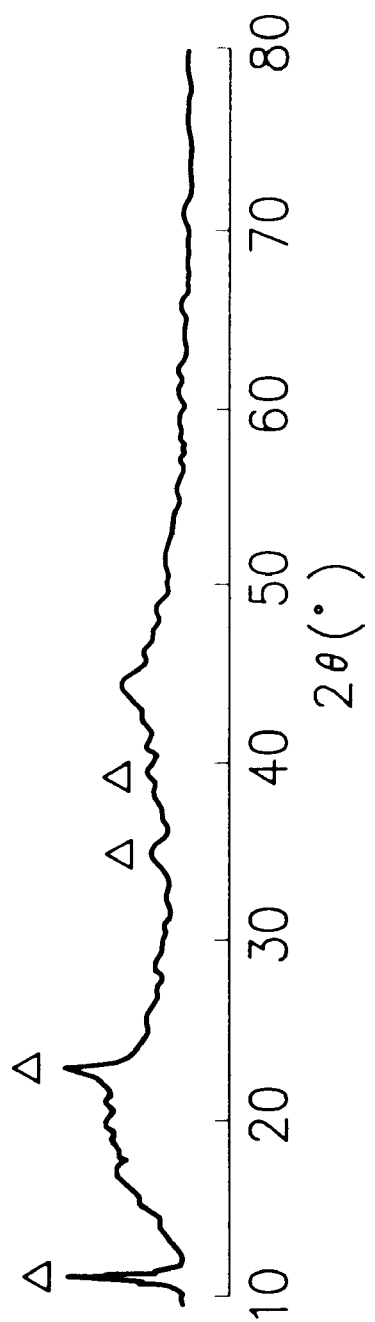
FIG. 7 shows an X-ray diffraction chart of a magnesium-nickel-aluminum composite body powder after the immersion treatment in an electrolyte solution, obtained in Example 1 which will be described later.

However, there were observed peaks belonging to Al—Mg composite hydroxide in the X-ray diffraction chart shown in FIG. 7.

2. Preparation of Anode 301

To the Mg—Ni—Al composite alloy powder obtained in the above step 1, a copper powder comprising soft copper particles as an electrically conductive auxiliary was admixed at a weight ratio of 1:3 to obtain a mixture. The mixture was subjected to press forming at a press load of 12 $t/cm^2$ by means of a press machine, where the mixture was press-formed into a disk form electrode body as an anode 301.

In the above press-forming, the soft copper particles are mutually connected to form a copper matrix and the Mg—Ni—Al composite alloy powder is distributed in the copper matrix, whereby said electrode body is formed. The copper matrix comprising the mutually connected copper particles functions as an anode collector. In other words, the electrode body obtained has a structure comprising the porous copper collector impregnated with the composite alloy powder as the anode active material.

3. Treatment of the Anode

The anode obtained in the above step 2 was treated by immersing it in a 7 M (mol/liter) KOH (potassium hydroxide) aqueous solution of containing 1 M (mol/liter) of LiOH (lithium hydroxide) [this KOH aqueous solution is corresponding to an electrolyte solution used in an alkali rechargeable battery of the present invention].

A specimen of the anode thus treated was subjected to X-ray diffraction analysis in the same manner as in the step 1 to obtain an X-ray diffraction chart. There were observed a broad diffraction peak belonging to an alloy, a diffraction peak belonging to Cu (which is the electrically conductive auxiliary), and diffraction peaks belonging to Mg—Al composite hydroxide in the X-ray diffraction chart.

4. Preparation of Cathode 303

92% by weight of a nickel hydroxide powder was mixed with 8% by weight of a cobalt oxide powder to obtain a mixture. The mixture was mixed with an aqueous solution containing 0.5% by weight of carboxymethylcellulose as a binder to obtain a paste. The paste was applied onto a foam nickel substrate (as a collector) of 1.5 mm in thickness, 400 g/m$^2$ per an unit area, 200 μm in pore diameter, and 95% in porosity so as to impregnate the foam nickel substrate with the paste. The foam nickel substrate applied with the paste was dried at 120° C. for an hour to obtain an electrode. The electrode was pressed so as to have a thickness of 0.8 mm. Then, the electrode was stamped out to obtain a cathode 303 having a prescribed size.

5. Provision of Electrolyte Solution

There was provided a 7 M (mol/liter) KOH (potassium hydroxide) aqueous solution containing 1 M (mol/liter) of LiOH (lithium hydroxide) as the electrolyte solution.

6. Provision of Separator (as an Ion Conductor 302)

As the separator, there was provided a separator comprising an unwoven polyethylene member applied with hydrophilic treatment having a number of micropores.

7. Fabrication of Rechargeable Battery

The cathode 303 and the separator 302 were together inserted into a cathode can 305 made of a titanium clad stainless steel, and a gasket 306 made of polypropylene was installed in the cathode can 305. Then, the electrolyte solution was introduced into the cathode can 305 so that the separator 302 was impregnated with the electrolyte solution, and the anode 301 was superposed on the separator 302. Thereafter, an anode cap 304 made of a titanium clad stainless steel was capped while interposing a spacer (not shown in the figure) made of a stainless steel so as to supply a pressure between the cathode 303 and the anode 301, followed by caulking the cathode can 305 and the anode cap 304 by means of a caulking machine to seal the inside. Thus, there was obtained an alkali rechargeable battery having such configuration as shown in FIG. 3.

This rechargeable battery obtained in this example is of a cathode capacity-controlled type in that the anode capacity is greater than the cathode capacity.

EXAMPLE 2

The procedures of Example 1 were repeated, except that the preparation of the hydrogen absorption alloy in the step 1 of Example 1 was conducted as will described below, to obtain a coin type alkali rechargeable battery having such configuration as shown in FIG. 3.

Preparation of Hydrogen Absorption Alloy for the Anode

A magnesium powder having an average particle size of less than 10 μm and a nickel powder having an average particle size of less than 10 μm were mixed at a mol ratio of 1:1 to obtain a mixture.

The mixture was subjected to a grinding treatment in an argon gas atmosphere by means of a planetary ball mill at an acceleration of 5 G for 30 hours to obtain a magnesium-nickel alloy powder. A specimen of this magnesium-nickel alloy powder was subjected to X-ray diffraction analysis. The result revealed that this magnesium-nickel alloy powder has an amorphous structure as well as in the case of Example 1.

An aluminum powder was admixed to the amorphous magnesium-nickel alloy powder at an atomic ration 1:4 in terms of the relation of the aluminum element of the aluminum powder to the magnesium element of the amorphous magnesium-nickel alloy powder to obtain a mixture. The mixture was subjected to a grinding treatment in an argon gas atmosphere by means of a planetary ball mill at an acceleration of 5 G for 15 minutes to obtain a Mg—Ni—Al composite alloy powder.

A particle specimen of the Mg—Ni—Al composite alloy powder was subjected to elemental analysis with respect to its particle section by means of an X-ray analyzer. As a result, it was found that the aluminum was distributed only in a surface region of the particle specimen.

EXAMPLE 3

The procedures of Example 1 were repeated, except that the preparation of the hydrogen absorption alloy in the step 1 of Example 1 was conducted as will described below, to obtain a coin type alkali rechargeable battery having such configuration as shown in FIG. 3.

Preparation of Hydrogen Absorption Alloy for the Anode

A Mg$_2$Ni powder of less than 80 meshes in particle size obtained by way of high frequency fusion and grinding and a nickel powder having an average particle size of less than 10 μm were mixed at a mol ratio of 1:1 to obtain a mixture.

The mixture was subjected to a grinding treatment in an argon gas atmosphere by means of a planetary ball mill at an acceleration of 17 G for 2 hours to obtain a magnesium-nickel alloy powder. This magnesium-nickel alloy powder was found to have an amorphous structure as a result of X-ray diffraction analysis.

A lithium-aluminum (50:50) alloy powder was admixed to the amorphous magnesium-nickel alloy powder at an atomic ration 1:4 in terms of the relation of the sum of the lithium and aluminum elements to the magnesium element of the amorphous magnesium-nickel alloy powder to obtain a mixture. The mixture was subjected to a grinding treatment in an argon gas atmosphere by means of a planetary ball mill at an acceleration of 10 G for 15 minutes to obtain a Mg—Ni—Li—Al composite alloy powder.

EXAMPLE 4

The procedures of Example 1 were repeated, except that the treatment of the anode in the step 3 was not conducted, to obtain a coin type alkali rechargeable battery having such configuration as shown in FIG. 3.

EXAMPLE 5

The procedures of Example 1 were repeated, except that in the step 3 of Example 1, the anode obtained in the step 2 was treated as will be described below, to obtain a coin type alkali rechargeable battery having such configuration as shown in FIG. 3.

Treatment of the Anode

The anode obtained in the step 2 of Example 1 was treated by immersing it in a mixed aqueous solution containing 0.06 M(mol/liter) of MgCl$_2$, 0.03 M(mol/liter) of Na$_2$SO$_4$, and 0.002 M(mol/liter) of NaHCO$_3$, where after the mixed aqueous solution containing the anode was boiled for 30 minutes, the anode was taken out from the mixed aqueous solution, and it was washed with deionized water, followed by drying.

For the anode thus treated, examination by means of a scanning electron microscope was conducted. As a result, the anode was found to comprise alloy particles whose surfaces respectively having been covered by a coat.

Separately, the procedures for the preparation of the anode in Example 1 were repeated to obtain an anode. The anode was treated in the same manner as in the above, except that the mixed aqueous solution containing the anode immersed therein was boiled for a longer period of time.

For the anode thus treated, elemental analysis and X-ray diffraction analysis were conducted. As a result, the anode was found to comprise alloy particles whose surfaces respectively having been covered by a coat comprising a Mg—Al—Na hydrous composite oxide containing a chlorine compound, a sulfate compound and a carbonate compound.

EXAMPLE 6

The procedures of Example 1 were repeated, except that in the step 3 of Example 1, the anode obtained in the step 2 was treated as will be described below, to obtain a coin type alkali rechargeable battery having such configuration as shown in FIG. 3.
Treatment of the Anode The anode obtained in the step 2 of Example 1 was treated by immersing it in a mixed aqueous solution containing 2.0 M(mol/liter) of NaOH, 0.8 M(mole/liter) of LiCl, and 0.25 M(mol/liter) of $Na_4SiO_4$, where after the mixed aqueous solution containing the anode was allowed to stand for 30 minutes while maintaining the temperature of the mixed aqueous solution at 80° C., the anode was taken out from the mixed aqueous solution, and it was washed with deionized water, followed by drying.

For the anode thus treated, examination by means of a scanning electron microscope was conducted. As a result, the anode was found to comprise alloy particles whose surfaces respectively having been covered by a coat.

Separately, the procedures for the preparation of the anode in Example 1 were repeated to obtain an anode. The anode was treated in the same manner as in the above, except that the mixed aqueous solution containing the anode immersed therein was allowed to stand for a longer period of time while maintaining the temperature of the mixed aqueous solution at 80° C.

For the anode thus treated, elemental analysis and X-ray diffraction analysis were conducted. As a result, the anode was found to comprise alloy particles whose surfaces respectively having covered by a coat comprising a Mg—Al—Na—Li—Si hydrous composite oxide containing about 2% of Li and about 2% of Si.

EXAMPLE 7

The procedures of Example 1 were repeated, except that in the step 3 of Example 1, the anode obtained in the step 2 was treated as will be described below, to obtain a coin type alkali rechargeable battery having such configuration as shown in FIG. 3.
Treatment of the Anode The anode obtained in the step 2 of Example 1 was treated by immersing it in a mixed aqueous solution containing 1.0 M(mol/liter) of $CaCl_2$ and 0.03 M(mole/liter) of NaOH, where after the mixed aqueous solution containing the anode was boiled for 30 minutes, the anode was taken out from the mixed aqueous solution, and it was washed with deionized water, followed by drying.

For the anode thus treated, examination by means of a scanning electron microscope was conducted. As a result, the anode was found to comprise alloy particles whose surfaces respectively having been covered by a coat.

Separately, the procedures for the preparation of the anode in Example 1 were repeated to obtain an anode. The anode was treated in the same manner as in the above, except that the mixed aqueous solution containing the anode immersed therein was boiled for a longer period of time.

For the anode thus treated, elemental analysis and X-ray diffraction analysis were conducted. As a result, the anode was found to comprise alloy particles whose surfaces respectively having covered by a coat comprising a Mg—Al—Na—Ca hydrous composite oxide containing a chlorine compound.

EXAMPLE 8

The procedures of Example 1 were repeated, except that in the step 3 of Example 1, the anode obtained in the step 2 was treated as will be described below, to obtain a coin type alkali rechargeable battery having such configuration as shown in FIG. 3.
Treatment of the Anode The anode obtained in the step 2 of Example 1 was treated by immersing it in a mixed aqueous solution containing 1.0 M(mol/liter) of LiOH and 1.0 M (mole/liter) of $KNO_3$, where after the mixed aqueous solution containing the anode was allowed to stand for 30 minutes while maintaining the temperature of the mixed aqueous solution at 75° C., the anode was taken out from the mixed aqueous solution, and it was washed with deionized water, followed by drying.

For the anode thus treated, examination by means of a scanning electron microscope was conducted. As a result, the anode was found to comprise alloy particles whose surfaces respectively having been covered by a coat.

Separately, the procedures for the preparation of the anode in Example 1 were repeated to obtain an anode. The anode was treated in the same manner as in the above, except that the mixed aqueous solution containing the anode immersed therein was allowed to stand for a longer period of time while maintaining the temperature of the mixed aqueous solution at 75° C.

For the anode thus treated, elemental analysis and X-ray diffraction analysis were conducted. As a result, the anode was found to comprise alloy particles whose surfaces respectively having covered by a coat comprising a Mg—Al—Li—K hydrous composite oxide containing a nitrate compound.

EXAMPLE 9

The procedures of Example 1 were repeated, except that the steps 1 to 3 in Example 1 were conducted as will be described below, to obtain a coin type alkali rechargeable battery having such configuration as shown in FIG. 3.
1. Preparation of Hydrogen Absorption Alloy A $Mg_2Ni$ powder of less than 80 meshes in particle size obtained by way of high frequency fusion and grinding and a nickel powder having an average particle size of less than 10 $\mu m$ were mixed at a mol ratio of 1:1 to obtain a mixture.

The mixture was subjected to a grinding treatment in an argon gas atmosphere by means of a planetary ball mill at an acceleration of 17 G for 2 hours to obtain a magnesium-nickel alloy powder. This magnesium-nickel alloy powder was found to have an amorphous structure.

Now, a sample of the Mg—Ni alloy powder was immersed in a 7 M (mol/liter) KOH (potassium hydroxide) aqueous solution of containing 1 M (mol/liter) of LiOH (this KOH aqueous solution is corresponding to an electrolyte solution used in an alkali rechargeable battery of the present invention), where the Mg—Ni alloy powder sample was reacted with the KOH aqueous solution for 15 hours while maintaining the temperature of the KOH aqueous solution at 60° C. After this, the Mg—Ni alloy powder sample was taken out, and it was washed with pure water, followed by drying. For the Mg—Ni alloy powder sample thus treated, using the foregoing X-ray diffractpmeter, wide angle X-ray diffraction analysis using K$\alpha$-rays of Cu as a radiation source was conducted. As a result, there was obtained an X-ray diffraction chart shown in FIG. 8. In the X-ray diffraction chart shown in FIG. 8, there were observed distinct diffraction peaks appeared at near $2\theta=18.6°$ and at near $2\theta=38.0°$, belonging to magnesium hydroxide (Mg(OH)$_2$). When the time for the Mg—Ni alloy powder sample to be immersed in the KOH aqueous solution was prolonged, the intensities of the peaks belonging to magnesium hydroxide (Mg(OH)$_2$) were increased.

2. Preparation of Anode 301

To the Mg—Ni alloy powder obtained in the above step 1, a copper powder comprising soft copper particles as an electrically conductive auxiliary was admixed at a weight ratio of 1:3 to obtain a mixture. The mixture was subjected to press forming at a press load of 12 t/cm$^2$ by means of a press machine, where the mixture was press-formed into a disk form electrode body as an anode 301.

In the above press-forming, the soft copper particles are mutually connected to form a copper matrix and the Mg—Ni alloy powder is distributed in the copper matrix, whereby said electrode body is formed. The copper matrix comprising the mutually connected copper particles functions as an anode collector. In other words, the electrode body obtained has a structure comprising the porous copper collector impregnated with the composite alloy powder as the anode active material.

3. Treatment of the Anode

There was provided an electrolyte solution comprising a mixed aqueous solution containing 3.0 M(mol/liter) of KOH, 0.6 M(mol/liter) of KF, 0.2 M(mol/liter) of Na$_3$PO$_4$, and 0.4 M(mol/liter) of Al(OH)$_3$.

In this electrolyte solution, the anode obtained in the above step 2 as a positive electrode and a counter electrode comprising a glassy carbon material were positioned such that they were opposed to each other, where the anode was subjected to an anodization treatment by energizing between the two electrodes at a current density of 20 mA/cm$^2$ for one hour to case anodization reaction.

For the anode thus treated, examination was conducted by way of X-ray diffraction analysis. As a result, the anode was found to comprise alloy particles whose surfaces respectively having covered by a coat comprising a Mg—Al hydrous composite oxide.

EXAMPLE 10

The procedures of Example 9 were repeated, except that the step 3 in Example 9 was conducted as will be described below, to obtain a coin type alkali rechargeable battery having such configuration as shown in FIG. 3.

3. Treatment of the Anode

There was provided an electrolyte solution comprising a mixed aqueous solution containing 30 g of (NH$_4$)$_2$SO$_4$, 30 g of K$_2$Cr$_2$O$_7$, 2.5 ml of aqueous ammonia, and 1 liter of deionized water.

In this electrolyte solution, the anode obtained in the step 2 of Example 9 as a positive electrode and a counter electrode comprising a glassy carbon material were positioned such that they were opposed to each other, where the anode was subjected to an anodization treatment by energizing between the two electrodes at a current density of 20 mA/cm$^2$ for one hour while the temperature of the electrolyte solution at 50° C. to case anodization reaction.

For the anode thus treated, examination was conducted by way of X-ray diffraction analysis. As a result, the anode was found to comprise alloy particles whose surfaces respectively having covered by a coat comprising a Mg—Al hydrous composite oxide.

EXAMPLE 11

The procedures of Example 1 were repeated, except that in the step 5 of Example 1, there was provided a 7 M (mol/liter) potassium hydroxide (KOH) aqueous solution containing 1 M (mol/liter) of LiOH and 0.1 M (mol/liter) of NaAlO$_2$ as the electrolyte solution, to obtain a coin type alkali rechargeable battery having such configuration as shown in FIG. 3.

Comparative Example 1

The procedures of Example 9 were repeated, except that the step 3 (the treatment of the anode) in Example 9 was not conducted, to obtain a coin type alkali rechargeable battery having such configuration as shown in FIG. 3.

EVALUATION

1. The thickness of the insulating material coat layer covering the anode active material of the anode in each of Examples 1 to 11 was examined by way of surface analysis and the like. As a result, it was found to be 1 $\mu$m or less.

2. For the anode in each of Examples 1 to 10 and Comparative Example 1, evaluation was conducted with respect to its stability to the electrolyte solution used in an alkali rechargeable battery in the following manner.

In accordance with the procedures to obtain the anode in each of Examples 1 to 10 and Comparative Example 1, there was prepared an anode for each of Examples 1 to 10 and Comparative Example 1. In this way, there were obtained eleven different anodes. Each of the eleven anodes was evaluated as will be described below.

There was provided a 7 M (mol/liter) KOH (potassium hydroxide) aqueous solution of containing 1 M (mol/liter) of LiOH as said electrolyte solution.

Each anode was immersed in the KOH aqueous solution as the electrolyte solution, where the anode was reacted with the KOH aqueous solution for 15 hours while maintaining the temperature of the KOH aqueous solution at 60° C. After this, the anode was taken out, and it was washed with pure water, followed by drying. For the anode thus treated, using the foregoing X-ray diffractometer, wide angle X-ray diffraction analysis using K$\alpha$-rays of Cu as a radiation source was conducted to obtain an X-ray diffraction chart. Thus, there were obtained eleven X-ray diffraction charts. The stability of each anode to the electrolyte solution was evaluated on the basis of the intensity of a diffraction peak appeared at near $2\theta=38.0°$ belonging to magnesium hydroxide (Mg(OH)$_2$) in the X-ray diffraction chart.

The diffraction peak intensity in each of Examples 1 to 10 was normalized by that in Comparative Example 1 to obtain a diffraction peak intensity ration of the magnesium hydroxide (Mg(OH)$_2$). The results obtained are collectively shown in Table 1.

Here, in the experimental studies by the present inventors, there was obtained a finding that in the case of a nickel-metalhydride rechargeable battery whose anode comprising a Mg—Ni alloy, there is a tendency in that a magnesium hydroxide is produced in the anode to markedly reduce the discharge capacity in the charging and discharging cycle is repeated.

Based on the results shown in Table 1, there was obtained a finding that in any of the anodes obtained in Examples 1 to 10 belonging to the present invention, a magnesium hydroxide which is a main factor of deteriorating the charging and discharging cycle performance of an alkali rechargeable battery is desirably prevented from being produced.

For the anode in Example 4, no pre-treatment was conducted. However, after the stability evaluation to the electrolyte solution, a specific diffraction peak belonging to a Mg—Al composite hydrous oxygen which is similar to that in Example 1 was appeared. This indicates that a coat layer comprising a Mg—Al composite hydrous oxide is formed on the surface of the anode at a speed which is faster than that of causing a magnesium hydroxide.

3. For each of the rechargeable batteries obtained in Examples 1 to 11 and Comparative Example 1, evaluation was conducted with respect to its characteristics in the following manner.

Each rechargeable battery is subjected to the following charging and discharging cycle test. That is, a cycle in that charging is performed for 10 hours under condition of room temperature wherein an electricity of a quantity corresponding to 150% of the battery capacity is charged at a constant electric current of a value of 0.1 C (an electric current of 0.1 time a value of capacity/time) obtained on the basis of an electric capacitance calculated from the cathode active material of the rechargeable battery; a pause for one hour is taken; then discharging is performed at a constant electric current of a value of 0.05 C (the electric current of 0.05 time the value of the capacity/the time) until the battery voltage reaches 0.9 V; and a pause for one hour is taken, is repeated 10 times, wherein the discharged electricity quantity (hereinafter referred to as "discharge capacity") is measured in each cycle.

And there is obtained a ratio of the discharge capacity in the 10th cycle to that in the first cycle.

In this way, for each rechargeable battery, there was obtained a ratio of the discharge capacity in the 10th cycle to that in the first cycle (this ratio will be referred to as "discharge capacity ratio").

The resultant discharge capacity ratios of the rechargeable batteries of Examples 1 to 11 and Comparative Example 1 are collectively shown in Table 2.

In addition, there was obtained a ratio of the discharge capacity in the 10th cycle of each of the rechargeable batteries of Examples 1 to 11 to that of the rechargeable battery of Comparative Example 1, which is set at 1.00. The results obtained are collectively shown in Table 2.

As the results shown in Table 2 illustrate, it is understood that any of the rechargeable batteries of Examples 1 to 11 in which the anode according to the present invention is used has a satisfactorily high discharge capacity which is hardly decreased even the charging and discharging cycle is continuously repeated over a long period of time. Here, complementally saying, what the charging and discharging cycle could be repeatedly performed in any of the rechargeable batteries Examples 1 to 11 indicates that the foregoing coat layer of each of the anodes used in these rechargeable batteries effectively allows hydrogen or hydrogen ion to pass therethrough.

Now, for the rechargeable battery obtained in Example 4, although the pre-treatment by means of the electrolyte solution was not conducted for the anode used therein, the evaluated results thereof are similar to those of the rechargeable battery obtained in Example 1. The reason for this is considered such that the aluminum material constituting the surface layer region of the Mg—Ni—Al composite alloy powder was reacted the electrolyte in the rechargeable battery to convert into a Mg—Al composite hydrous oxide as well as the case of Example 1.

From the evaluated results of the rechargeable battery obtained in Example 11, it is understood that by adding an aluminum compound to the electrolyte solution of the rechargeable battery, the charging and discharging performance of the rechargeable battery is more improved.

The reason for this is considered such that the aluminate ion in the electrolyte functions to prevent the coat comprising the Mg—Al composite hydrous oxide from being eluted whereby maintaining the stability of the coat over a long period of time, and in addition, when a crack should be occurred at the surface region of the anode so that the cracked portion is exposed, the aluminate ion functions to newly form a coat comprising a Mg—Al hydroxide oxide so as to cover said exposed portion.

As apparent from the above description, according to the present invention, by using an anode comprising an amorphous phase-containing magnesium-nickel alloy powder whose surface is covered by a specific insulating material coat layer, there can be attained a high performance alkali rechargeable battery which has a satisfactorily high charge-and-discharge capacity which is hardly deteriorated even when the charging and discharging cycle is continuously repeated over a long period of time and which has a prolonged charging and discharging cycle life.

All the rechargeable batteries described in the above examples are corresponding to an alkali nickel-hydride alloy rechargeable battery. However, this is not limitative.

The use of the anode of the present invention, comprising an amorphous phase-containing magnesium-nickel alloy powder whose surface is covered by a specific insulating material coat layer, enables one to produce other alkali rechargeable batteries such as air-metalhydride alloy rechargeable battery, having a satisfactorily high charge-and-discharge capacity and a prolonged charging and discharging cycle life.

TABLE 1

|  | diffraction peak intensity ratio of $Mg(OH)_2$ |
|---|---|
| Example 1/Comparative Example 1 | could not be obtained |
| Example 2/Comparative Example 1 | could not be obtained |
| Example 3/Comparative Example 1 | could not be obtained |
| Example 4/Comparative Example 1 | could not be obtained |
| Example 5/Comparative Example 1 | 0.28 |
| Example 6/Comparative Example 1 | 0.30 |
| Example 7/Comparative Example 1 | 0.33 |
| Example 8/Comparative Example 1 | 0.19 |
| Example 9/Comparative Example 1 | could not be obtained |
| Example 10/Comparative Example 1 | 0.09 |

TABLE 2

|  | discharge capacity ratio 10$^{th}$ cycle/1$^{st}$ cycle | discharge capacity ratio (10$^{th}$ cycle) Example/Comparative Example 1 |
|---|---|---|
| Example 1 | 0.87 | 1.58 |
| Example 2 | 0.87 | 1.53 |
| Example 3 | 0.86 | 1.54 |
| Example 4 | 0.86 | 1.42 |
| Example 5 | 0.84 | 1.44 |
| Example 6 | 0.80 | 1.33 |
| Example 7 | 0.81 | 1.33 |
| Example 8 | 0.82 | 1.37 |

TABLE 2-continued

|  | discharge capacity ratio 10th cycle/1st cycle | discharge capacity ratio (10th cycle) Example/Comparative Example 1 |
|---|---|---|
| Example 9 | 0.89 | 1.53 |
| Example 10 | 0.88 | 1.47 |
| Example 11 | 0.92 | 1.60 |
| Comparative Example 1 | 0.48 | 1.00 |

What is claimed is:

1. A rechargeable battery comprising at least an anode, a cathode, and an electrolyte comprising a hydroxide of an alkali metal or an aqueous solution containing said hydroxide, said anode principally comprising a magnesium-nickel alloy capable of storing hydrogen therein and releasing said hydrogen stored therein in an electrochemical reaction, wherein said magnesium-nickel alloy constituting said anode has a surface having a coat layer provided thereon, and said coat layer comprises an insulating material selected from the group consisting of a hydrous oxide, a hydroxide, and an ionomer-containing polymer which is not dissolved in said electrolyte solution, which restrains a reaction which forms a magnesium hydroxide when said magnesium-nickel alloy contacts with said electrolyte solution, and which allows hydrogen or hydrogen ion to pass therethrough.

2. A rechargeable battery according to claim 1, wherein said magnesium-nickel alloy constituting said anode contains amorphous phases therein.

3. A rechargeable battery according to claim 1, wherein said hydrous oxide is a hydrous oxide selected from a group consisting of hydrous oxides containing Mg and one or more elements selected from a group consisting of Al, In, Si, Ge, Ca, Sr, Ti, Zr, Hf, Y, Zn, Fe, Cr, Li, Na and K.

4. A rechargeable battery according to claim 1, wherein said hydroxide is a hydroxide selected from a group consisting of hydroxides containing Mg and one or more elements selected from a group consisting of Al, In, Si, Ge, Ca, Sr, Ti, Zr, Hf, Y, Zn, Fe, Cr, Li, Na and K.

5. A rechargeable battery according to claim 1, wherein said hydrous oxide is a hydrous oxide selected from a group consisting of hydrous oxides containing Mg and Al, hydrous oxides containing Mg and Si, and hydrous oxides containing Mg, Al and Si.

6. A rechargeable battery according to claim 1, wherein said hydroxide is a hydroxide selected from a group consisting of hydroxides containing Mg and Al, hydroxides containing Mg and Si, and hydroxides containing Mg, Al and Si.

7. A rechargeable battery according to claim 1, wherein said insulating material constituting said coat layer comprises a composite compound comprising a hydrous oxide and having a molecular structure containing one or more salts selected from a group consisting of carbonates, nitrates, sulfates, phosphates, chlorides, and fluorides.

8. A rechargeable battery according to claim 7, wherein said hydrous oxide is a hydrous oxide selected from a group consisting of hydrous oxides containing Mg and one or more elements selected from a group consisting of Al, In, Si, Ge, Ca, Sr, Ti, Zr, Hf, Y, Zn, Fe, Cr, Li, Na and K.

9. A rechargeable battery according to claim 7, wherein said hydrous oxide is a hydrous oxide selected from a group consisting of hydrous oxides containing Mg and Al, hydrous oxides containing Mg and Si, and hydrous oxides containing Mg, Al and Si.

10. A rechargeable battery according to claim 1, wherein said insulating material constituting said coat layer comprises a composite compound comprising a hydroxide and having a molecular structure containing one or more salts selected from a group consisting of carbonates, nitrates, sulfates, phosphates, chlorides, and fluorides.

11. A rechargeable battery according to claim 10, wherein said hydroxide is a hydroxide selected from a group consisting of hydroxides containing Mg and one or more elements selected from a group consisting of Al, In, Si, Ge, Ca, Sr, Ti, Zr, Hf, Y, Zn, Fe, Cr, Li, Na and K.

12. A rechargeable battery according to claim 10, wherein said hydroxide is a hydroxide selected from a group consisting of hydroxides containing Mg and Al, hydroxides containing Mg and Si, and hydroxides containing Mg, Al and Si.

13. A rechargeable battery according to claim 1, wherein said insulating material constituting said coat layer contains amorphous phases therein.

14. A process for producing a rechargeable battery as defined in claim 1, said process further comprising a step of forming said anode by coating said magnesium-nickel alloy with at least an aluminum material, said coating is conducted by adding powder of said aluminum material to powder of said magnesium-nickel alloy and mechanically admixing them.

15. The process according to claim 14, wherein said magnesium-nickel alloy powder contains amorphous phases therein.

16. The process according to claim 14, wherein said process further includes a step of forming an electrode using a powdery material obtained by admixing said magnesium-nickel alloy powder and said aluminum material powder and immersing in a reaction solution.

17. The process according to claim 16, wherein said reaction solution is a solution containing one or more salts selected from the group consisting of sodium hydroxide, potassium hydroxide, lithium hydroxide, calcium hydroxide, sodium bicarbonate, sodium chloride, calcium chloride, magnesium chloride, aluminum chloride, zirconium trichloride, zirconium tetrachloride, titanium trichloride, titanium tetrachloride, iron trichloride, sodium sulfate, magnesium sulfate, lithium nitrate, potassium nitrate, sodium nitrate, sodium silicate, sodium fluoride, sodium phosphate, and potassium chromate.

18. The process according to claim 17, wherein said solution as said reaction solution is an aqueous solution or an alcohol solution.

19. A process for producing a rechargeable battery defined in claim 1, said process comprising: forming said anode by forming an electrode by coating said magnesium-nickel alloy with at least an aluminum material, and subjecting said electrode to a treatment using pressurized steam.

20. A process for producing a rechargeable battery defined in claim 1, said process comprising: forming said anode by positioning an electrode formed using a magnesium-nickel powder in an electrolyte solution as a positive electrode such that said positive electrode is opposed to a counter electrode positioned in said electrolyte solution, and subjecting said electrode as said positive electrode to an anodization treatment.

21. A process for producing a rechargeable battery defined in claim 1, said process comprising: forming said anode by positioning an electrode comprising said magnesium-nickel alloy coated with an aluminum material in an electrolyte solution as a positive electrode such that said positive electrode is opposed to a counter electrode positioned in said electrolyte solution, and subjecting said material as said positive electrode to an anodization treatment.

22. A process for producing a rechargeable battery defined in claim 1, said process comprising: forming said anode by coating a magnesium-nickel alloy powder with an ionomer-containing polymer.

23. A process for producing a rechargeable battery defined in claim 1, said process comprising: forming said anode by coating a magnesium-nickel alloy powder with an ionomer-containing polymer, and coating said magnesium-nickel alloy powder coated with said ionomer-containing polymer with another ionomer-containing polymer.

24. The process according to claim 23, wherein said ionomer-containing polymer is an ionic polymer selected from a group consisting of ionic polymers having a covalent bond and an ionic bond.

25. A process for producing a rechargeable battery defined in claim 1, said process comprising: forming said anode by providing an electrode formed using an amorphous phase-containing magnesium-nickel alloy powder, and coating said electrode with an ionomer-containing polymer.

* * * * *

UNITED STATES PATENT AND TRADEMARK OFFICE
CERTIFICATE OF CORRECTION

PATENT NO. : 6,475,664 B1
DATED : November 5, 2002
INVENTOR(S) : Soichiro Kawakami et al.

It is certified that error appears in the above-identified patent and that said Letters Patent is hereby corrected as shown below:

Column 8,
Line 12, "$\leq 1$." should read -- $\geq 1$. --; and
Line 28, "fluorides" should read -- fluorides. --.

Column 9,
Line 51, "aliminate" should read -- aluminate --.

Column 15,
Line 38, "may takes" should read -- may take --.

Column 17,
Line 13, "can 305)" should read -- can (305) --; and
Line 57, "10 pm" should read -- 10μm --.

Column 23,
Line 3, "diffractpmeter," should read -- diffractometer, --.

Signed and Sealed this

Second Day of December, 2003

JAMES E. ROGAN
*Director of the United States Patent and Trademark Office*